United States Patent
Upton et al.

(10) Patent No.: US 12,145,066 B2
(45) Date of Patent: Nov. 19, 2024

(54) SYSTEMS AND METHODS FOR AN OBJECT MOVEMENT ENGINE IN A GAMING ENVIRONMENT

(71) Applicant: CEO Vision, Inc, Cary, NC (US)

(72) Inventors: Brian Upton, Los Angeles, CA (US); Bert Freudenberg, Los Angeles, CA (US); David A. Smith, Cary, NC (US)

(73) Assignee: CEO Vision, Inc, Cary, NC (US)

( * ) Notice: Subject to any disclaimer, the term of this patent is extended or adjusted under 35 U.S.C. 154(b) by 269 days.

(21) Appl. No.: 17/221,622

(22) Filed: Apr. 2, 2021

(65) Prior Publication Data

US 2021/0308576 A1 Oct. 7, 2021

Related U.S. Application Data

(60) Provisional application No. 63/141,447, filed on Jan. 25, 2021, provisional application No. 63/006,642, filed on Apr. 7, 2020.

(51) Int. Cl.
*A63F 13/56* (2014.01)
*A63F 13/40* (2014.01)
*A63F 13/577* (2014.01)

(52) U.S. Cl.
CPC .............. *A63F 13/56* (2014.09); *A63F 13/40* (2014.09); *A63F 13/577* (2014.09); *A63F 2300/643* (2013.01)

(58) Field of Classification Search
CPC ........ A63F 13/56; A63F 13/40; A63F 13/577; A63F 13/355; A63F 13/573;

(Continued)

(56) References Cited

U.S. PATENT DOCUMENTS 7,904,194 B2 * 3/2011 Brown ................... G05B 15/02
 700/174
8,446,414 B2 * 5/2013 Reville ................... A63F 13/12
 463/31

(Continued)

OTHER PUBLICATIONS

ISA/US, "Notification of Transmittal of the ISR and the Written Opinion of the International Searching Authority, or the Declaration," in PCT Application No. PCT/US2021/025833 dated Aug. 25, 2021, 11 pages.

*Primary Examiner* — William H McCulloch, Jr.
(74) *Attorney, Agent, or Firm* — Kang S. Lim

(57) ABSTRACT

Systems and methods for a unitary physics engine and image smoothing is provided. In this method, a game and a plug-in physics engine are initialized on multiple gaming systems. Time advancement messages are received by a controller within the physics engine from a reflector, causing the physics engine to compute events in a queue up to the time of the timing message, according to the same set of physics rules. This causes a deterministic computation of all object positions within the game that is identical across all gaming systems. In between the deterministic calculations, the local gaming system may compute speculative object positions, based upon the last deterministic position and the accelerations, velocities and object attributes at that moment. These speculative calculations may be performed at least as often as the frame rate of the display (typically 30, 60 or 120 frames per second). Once the next deterministic calculations are refreshed, the true position of the objects may be compared against the current speculative position, and if needed, a reconciliation may be performed.

19 Claims, 21 Drawing Sheets

(58) Field of Classification Search
CPC ............ A63F 13/352; A63F 2300/643; G06F 3/0412; G06K 7/143; H04L 67/1095; H04L 67/131; H04W 4/20; H04W 84/042
See application file for complete search history.

(56) References Cited

U.S. PATENT DOCUMENTS

| | | | | |
|---|---|---|---|---|
| 9,687,729 B2* | 6/2017 | Hansson | ............... | A63F 13/55 |
| 10,226,700 B2* | 3/2019 | Gault | ............... | A63F 13/22 |
| 10,265,612 B2* | 4/2019 | Hansson | ............... | A63F 13/55 |
| 11,427,224 B2* | 8/2022 | Smith | ............... | H04L 67/52 |
| 11,537,227 B2* | 12/2022 | Freudenberg | ............... | H04W 4/20 |
| 11,623,140 B2* | 4/2023 | Colenbrander | ............... | G06F 9/547 |
| | | | | 463/42 |
| 2003/0177187 A1* | 9/2003 | Levine | ............... | H04L 67/131 |
| | | | | 709/205 |
| 2006/0004874 A1* | 1/2006 | Hutcheson | ............... | A63F 13/332 |
| 2010/0009747 A1* | 1/2010 | Reville | ............... | A63F 13/30 |
| | | | | 463/31 |
| 2010/0131079 A1* | 5/2010 | Brown | ............... | G05B 15/02 |
| | | | | 700/17 |
| 2011/0212783 A1* | 9/2011 | Dale | ............... | A63F 13/798 |
| | | | | 463/42 |
| 2015/0352437 A1* | 12/2015 | Koseki | ............... | A63F 13/5255 |
| | | | | 463/31 |
| 2018/0165914 A1* | 6/2018 | Sternberg | ............... | G07F 17/3225 |
| 2018/0167475 A1* | 6/2018 | Agarwal | ............... | H04L 63/101 |
| 2020/0368616 A1* | 11/2020 | Delamont | ............... | H04N 13/239 |
| 2020/0377123 A1* | 12/2020 | Smith | ............... | H04L 67/12 |
| 2020/0382232 A1* | 12/2020 | Smith | ............... | H04J 3/0673 |
| 2021/0308576 A1* | 10/2021 | Upton | ............... | A63F 13/352 |
| 2022/0001279 A1* | 1/2022 | Colenbrander | ............... | G06F 3/0685 |
| 2022/0197422 A1* | 6/2022 | Freudenberg | ............... | G06K 7/143 |
| 2022/0212101 A1* | 7/2022 | Todorovic | ............... | A63F 13/34 |
| 2022/0319694 A1* | 10/2022 | Peterson | ............... | G16H 40/67 |
| 2022/0395752 A1* | 12/2022 | Kennett | ............... | G06V 20/41 |
| 2023/0118548 A1* | 4/2023 | Komatsu | ............... | H04L 67/131 |
| | | | | 463/31 |
| 2023/0236687 A1* | 7/2023 | Freudenberg | ............... | G06F 3/0412 |
| | | | | 345/173 |
| 2023/0241494 A1* | 8/2023 | Colenbrander | ............... | A63F 13/355 |
| | | | | 463/42 |
| 2024/0004529 A1* | 1/2024 | Donskoy | ............... | A63F 13/45 |

* cited by examiner

SYSTEMS AND METHODS FOR AN OBJECT MOVEMENT ENGINE IN A GAMING ENVIRONMENT

CROSS REFERENCE TO RELATED APPLICATIONS

This U.S. non-provisional application claims the benefit of U.S. provisional application No. 63/006,642 filed Apr. 7, 2020 and also U.S. provisional application No. 63/141,447 filed Jan. 25, 2021, which applications are incorporated herein in their entirety by this reference.

BACKGROUND

The present invention relates to systems and methods for game experience improvements utilizing a computing architecture focused on deep collaboration, thereby allowing for a unified physics engine to ensure in game experience fidelity. Such systems and methods allow for improved gaming experience, especially where high levels of consistency between multiplayer games is necessary.

In nearly all games, actions and movements of objects are driven by a physics engine. In the most simplistic of games, this may include rules regarding the character accelerations, and forces generated by the character (e.g., available jump height for example). In more sophisticated gaming environments, virtually every object within the game may include physical characteristics (such as mass, center of gravity, etc.), and are subject to similar physics constraints (often with a couple exceptions). These advanced games result in very large numbers of complex calculations within the environment. However, for single player games, and with current computing power, it is often very easy to perform the calculations.

With the rise in multiplayer game environments, however, the actions within each game environment result in additional calculations. There have traditionally been two approaches to meeting this scaling problem. The first solution is to have a centralized server completing all calculations for all game members, and outputting the resulting calculations to each player's local system. This approach works well for relatively few players, but for massively multiplayer environments, the computational resources to have a centralized server completing all calculations becomes untenable.

The second solutions, which is widely utilized currently, is to have each local machine complete calculations within the area of the game that the player exists in. Theoretically, if each local computer is utilizing the same physics engine, this results in the same experience between all players in the shared game. Generally this is accurate; however, differences in the computational power, clock speed, memory, and other specifications, actually result in differences between these physics calculations. In some cases it even results in material differences in game performance, resulting in one player potentially experiencing the game differently than another player.

Within a causal gaming environment, it is possible that such marginal differences in gaming experiences are acceptable. However for more "hard core" gamers, and especially for professional gamers, these experience differences are unacceptable.

Further problems with gaming experiences result in the fact that computations of in game physics may be slower that display frame rates. Generally, frame rates are 30, 60 or 120 frames per second (although higher rates are possible). This can result in stuttered images, which are annoying at best. This issue of frame rates exceeding computational updates not only applies to gaming environments, but also is an issue for video editing, sports viewing, and any situation where exceptionally smooth viewing is needed.

Thus far, there have not been sufficient means to address these issues. In the realm of physics engines, for critical gaming environments, such as professional tournaments, all players are mandated to use similar hardware to further minimize differences in performance. This methodology is difficult to expand to a larger gaming audience, however, and further is only masking the underlying problem.

With regards to image smoothing, the only current solution is to increase computations to the level of frame rate refresh (or live with some marginal stutter). This can be very resource intensive, and is why high fidelity video editing hardware is so expensive.

It is therefore apparent that an urgent need exists for a new systems and methodologies that enable unified physics within a game environment, and methods for smoothing of the displayed content without massively increasing computational demands. Such systems and methods would result in significantly improved gaming, sports, and video editing experiences.

SUMMARY

To achieve the foregoing and in accordance with the present invention, systems and methods for a unified physics engine and image smoothing is provided. Such systems and methods enable improved gaming, sports, and video editing experiences.

In some embodiments, a method for a unified physics engine within a multi-player gaming environment is provided. In this method, a game is initialized on multiple gaming systems. Additionally a plug-in physics engine is initialized on the local gaming systems. Time advancement messages are received by a controller within the physics engine from a reflector. The reflector may include a light weight component hosted on a centralized gaming server. The timing message causes the physics engine to compute events in a queue up to the time of the timing message, according to the same set of physics rules. This causes a deterministic computation of all object positions within the game that is identical across all gaming systems.

In some cases, only material objects have their positions computed in this manner, and non-material objects (such a smoke, trees swaying in the breeze, etc.) are computed by an internal physics engine to the game itself. The objects may include any in game objects, including player avatars.

The deterministic plug-in physics engine may calculate object locations at a rate of one every 100-200 ms. This creates a need for image smoothing, especially in the arena of a game environment, a video editing environment, and a virtual sports environment. In between the deterministic calculations, the local gaming system may compute speculative object positions, based upon the last deterministic position and the accelerations, velocities and object attributes at that moment. These speculative calculations may be performed at least as often as the frame rate of the display (typically 30, 60 or 120 frames per second). Once the next deterministic calculations are refreshed, the true position of the objects may be compared against the current speculative position, and if needed a reconciliation may be performed.

Reconciliation includes the steps of determining a difference between the speculative position and the true position, dividing the difference into equal spacing, determining reconciliation timing, and over the timing, incrementally moving the object by the equal spacing. It may also include incorporating one or more obscuring effects (e.g., sparks, smoke, blast effects, etc.).

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
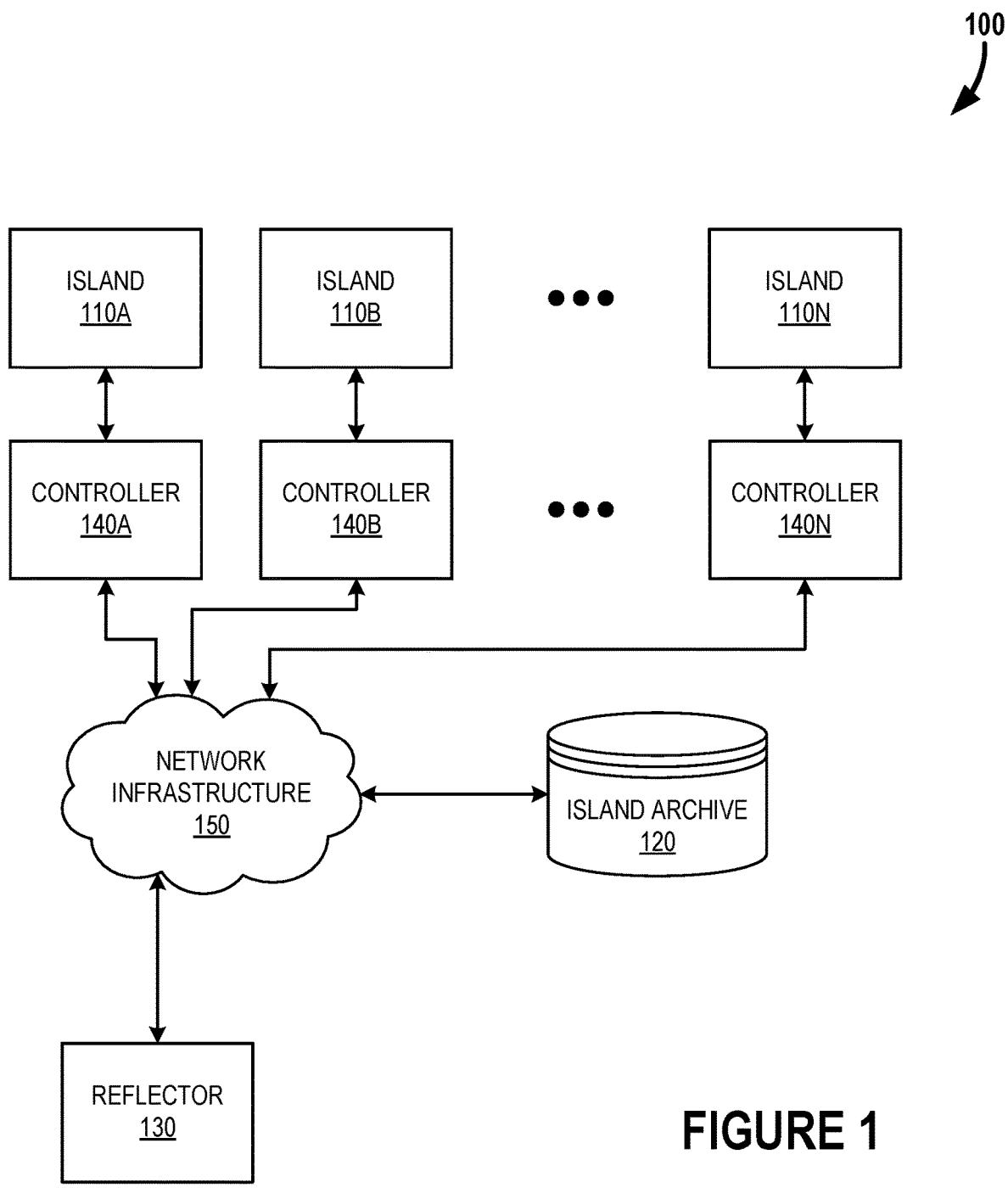
FIG. 1 is an example logical diagram of a system for a shared virtual environment, in accordance with some embodiments.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

Fundamental to a unity physics engine is the concept of a shared space which deterministically computes the events and movements within the space across all devices sharing the computational space. This ensures perfect synchronization between the various local systems, regardless of differences in hardware, software versioning, or the like. As will be discussed below in significant detail, an external "heartbeat" message is provided to each local system, which causes the individual local machines to advance computations to the heartbeat time. This ensures that all computations are completed in a deterministic manner across all devices.

Many of the operating systems that are still being used were fundamentally designed thirty years ago, when the internet was nascent, and computing hardware was orders of magnitude less powerful than the hardware available today. The operating systems of the day were thus designed around these features: 1) each device was presumed to be fundamentally alone, and segregated from other devices, and 2) computational burdens were things to be minimized at all cost.

What resulted were operating systems that were non-portable, locked into specific environments that included a number of limitations to reduce computational overhead. Further, late bound programing languages, such as LISP and Smalltalk, were frowned upon due to their relatively slow speeds.

Since then, however, there has been an explosive increase in processing speeds, and graphical processor speeds in particular, which is underutilized by most current operating systems. The increased processing speeds have also made late bound languages viable for more real time applications than was previously possible. Further, the omnipresence of reliable and fast broadband internet (and in the near future 5G cellular service) illustrates the shortcomings of the traditional operating systems in terms of their portability and share-ability across user groups.

Applications exist that allow for some of this functionality, but these existing systems are required to operate within the confines of legacy operating systems, resulting in a number of limitations. Generally these application based approaches scale badly when involving very large numbers of users. One of the reasons for this is the very large bandwidth requirements required by such systems (especially when relying upon cellular signal). Traditionally, in a gaming environment, the shared environments are computed at a central server and renderings of the environment are provided to each end user. This requires a significant transfer of data to each user, resulting in bandwidth limitations. Alternatively, the games may compute some actions locally, such as object physics, but current systems operate differently based upon hardware specification and software versioning. This results in asynchronous calculations between local gaming machines (albeit minor variations).

Another hurdle for these traditional approaches is the client/server cost and complexity involved in developing and maintaining these simulations. Again, since the simulation/environment is centrally computed, the server side computing requirements expand exponentially as additional users are involved. Thus costs for the server end can rapidly spiral out of reach of many developers, and are difficult to deploy in a distributed fashion throughout a city or other environment. Likewise, there is introduced a single point of failure, which must be managed by intermittent outages, or an equally expensive redundancy system to avoid unwanted down time. Failure of such a mission critical system can result in injury or death, making traditional approaches exceptionally risky.

A final hurdle of these traditional shared space applications is the high degree of latency involved. Server side and user interaction latency dramatically limits a user's experience, resulting in virtually unusable remote rendering for applications, such as driving, where milliseconds of latency may have an impact on safety.

As noted, the following systems and methods are for a high fidelity physics computations between multiple gaming systems. Such physics computations are low latency, low bandwidth and nearly infinitely scalable without the high expense associated with server driven architectures. Further, these environments, through the reflection of messages between the various local machines embodied in each gaming system involved in the shared game, offers perfect fidelity that is ideally suited to massive multi-player use cases where perfect fidelity is a requirement.

I. Shared Environment Overview

As noted previously, traditional sharing of environments involves a centralized server model where the "world" is computed on a backend server, rendered in the central server, and renderings are delivered to the individual users via the internet. Such systems essentially "live stream" a video feed from the backend system, and suffer significantly from bandwidth concerns, latency, and extreme server related costs (e.g., limited scalability).

In other traditional systems, the world is still computed on the backend server device, but here updates to the world are then sent to the clients which in turn locally render the view that is presented to the user. Most games today fall within this category of operation. While still bandwidth intensive, and costly in terms of backend server requirements, such systems have a marginal improvement over a centrally rendered system in regards to these issues. However, latency can be a significant issue for this type of system, as well as a reduction in fidelity between the users' views. In a game setting, latency, and especially differences in the calculations made, can cause issues between game results on different local devices, which can be untenable for "hard core" gamers, and especially for professional gaming situations.

The present disclosure focuses on a new approach to a shared computational space that allows for a unity physics engine. In this architecture inputs are bound to, and sorted by, a lightweight reflector (either located within the game server, or alternatively within one of the local machines involved in the game) that guarantees that all copies of the world/calculations stay in bit perfect synchronization. In turn, rather than having a central server computing the 'world' local machines in the gaming computers independently administer to their perfect fidelity copy of the shared 'world'. Computations are locally performed, and the messaging to ensure that each computational copy is synchronized yet require minimal bandwidth requirements. In some embodiments the unitary engine may be referred to as "worldcore" for the sake of brevity. Worldcore is a modular game engine built on top of the disclosed synchronization SDK. It consists of a core entity-management system, where each entity is a model-view pair. These pairs have a dedicated communication channel so the model and the view within each entity can communicate directly with each other. The behavior of each entity can be extended through the addition of a modular components. These components provide services such as rendering, collision detection, and physical simulation. Generally, these components act as an interface between the entity and a global singleton manager that actually supplies the necessary services.

These systems and methods provide for a minimal server footprint, with virtually no server compute costs. Likewise, there is no server code required: the clients define the environment, and the reflector servers function only in a time-keeping manner. This decentralized operation allows for the system to be any size and distributed wherever it is desired. Latencies are minimized significantly below the current methodologies, and bandwidths are likewise a fraction of what a current shared environment requires.

Additionally, by not relying on a centralized backend server, there can be near instant server migrations allowing for latency improvements, or for when a gamer desires to join a new ongoing game. Indeed, security and privacy are a built in feature of these systems and methods, as will be discussed in greater detail below.

In order to more clearly describe the architecture enabling these shared environments, attention will now be turned to definitions that will assist in understanding the attendant figures and descriptions. The present architecture relies upon "objects" that are located within the "islands" running on each local computer. These "objects" each include a state and a behavior. An object can publish events, subscribe to events, and request future events. An object lives in a "domain" which is an abstraction of the environment within the cell. The domain assigns an ID to each of its objects, and manages their subscriptions. An object may have "parts". Part IDs are managed by the object. The object itself is a part, too. In some embodiments, an object and its parts can be addressed using a hierarchical URL scheme.

A shared domain (a.k.a. "island") contains "model" objects. An island has an internal clock that only advances when receiving external timestamped events. Future events generated on the island are relative to the island's internal clock. Much of the following discussion will focus on these shared domain islands.

Objects within the same domain may communicate directly (e.g., by method calls), or by publishing of and subscribing to events. Objects in different domains can only communicate via "events". Publishing an event informs the objects subscribed to that event. The publishing object may attach data that is sent along with the event. Publishing an event has no side-effects on the publishing object: there is no observable difference in behavior whether there are subscribers to that event or not.

Subscribing to an event means to register a handler to be invoked when that event is published. If the publishing object attached data to the event, the handler will receive that data when invoked. The handler typically is a method of the subscribing object, the data is passed as an argument.

Events are published to a "scope". The scope can be an arbitrary string, but typically is the URL of an object or part, in some embodiments. When subscribing to an event, a scope needs to be specified, too. Only events published to that scope will cause that subscriber's registered handler to be invoked.

When subscribing to a shared domain's events, that domain's objects, their subscriptions, and future event requests (collectively called an island) are replicated to the user's machine. That means, a snapshot is taken of the current state of the island, which is sent via the internet to the user, and the island is recreated from the snapshot. To further facilitate the discussion, FIG. 1 provides an example logical diagram of a system for such a shared virtual environment 100, in accordance with some embodiments. Here there are a series of shared domain islands 110a-n each coupled to one or more controllers 140a-n a reflector 130 and an island archive 120 via a central network infrastructure 150. Islands 110a-n can be easily saved in the island archive 120 database. Likewise, islands may be readily duplicated between different computational devices, such as when a player joins a game.

The network 150 is depicted as a network cloud and as such is representative of a wide variety of telecommunications networks, for instance the World Wide Web, the internet, secure data networks, cellular networks, direct radio signaling, satellite transmission, or through any combination thereof.

The reflector 130 plays two major roles. First, it acts as the clock for the replicated islands in that it determines when an external event will be executed, as will be discussed in greater detail below. These external events are the only information an island 110a-n has about the actual passage of time, so the island 110a-n simply cannot execute any pending messages in its message queue until it receives one of these time-stamped external messages. The second critical role played by the reflector 130 is to forward any messages it receives from a particular controller 140 to all of the currently registered islands 110a-n. Reflectors 130 can be located almost anywhere on the network and need not be collocated with a particular island 110a-n. As will be discussed in greater detail below, reflectors may be ideally located within the gaming server, although other distributed reflector positions are likewise possible.

The controller 140a-n is the non-replicated part of the island/controller pair. While the controller 140a-n and each island 110a-n are shown separate in this example diagram, it is entirely possible these two components are functionally co-located within a single local computational device. The role of the controller 140a-n is to act as the interface between the island 110a-n and the reflector 130 and between the other local machine software, such as the game being played, and the island. Its main job is to ship messages around between the other parts of the system. The controller 140a-n also manages the island's message queue, by determining when messages will get executed, as will be described in greater detail below. In some embodiments, a controller 140 can exist without an island 110a-n, acting as a proto-island until the real island is either created or duplicated. In this case it is used to maintain the message queue until either a new island is created or until an existing island is replicated.

Figure 2:
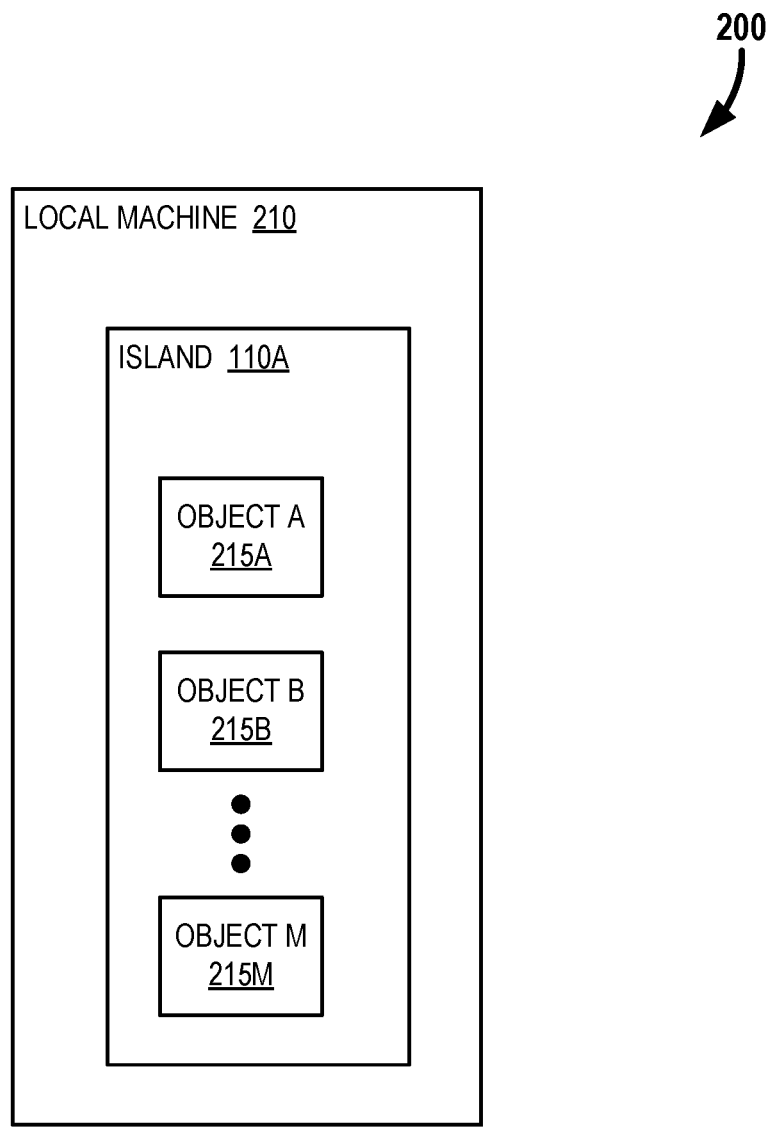
FIG. 2 is an example logical diagram of local machine, in accordance with some embodiments.

Turning to FIG. 2, an example illustration is provided of the local machine 210 which is embodying the local island 110a. Within each island 110a-n are a series of objects 215a-m. As discussed, objects 215a-m include a state and a behavior, may include parts, and can publish events, subscribe to events, and request future events. These objects may include objects within the game for which movement calculation based upon a unified set of physics rules are calculated.

Each of the islands 110a-n runs independently on the local computer 210. Each island calculates the operation of objects 215a-m within the island 110a, and generates calculations of movements for other game objects, including avatar movements and other objects. The islands 110a-n operate in replication to one another based upon synchronization messages provided from the reflector 130, as will be discussed in significant detail below.

Figure 3:
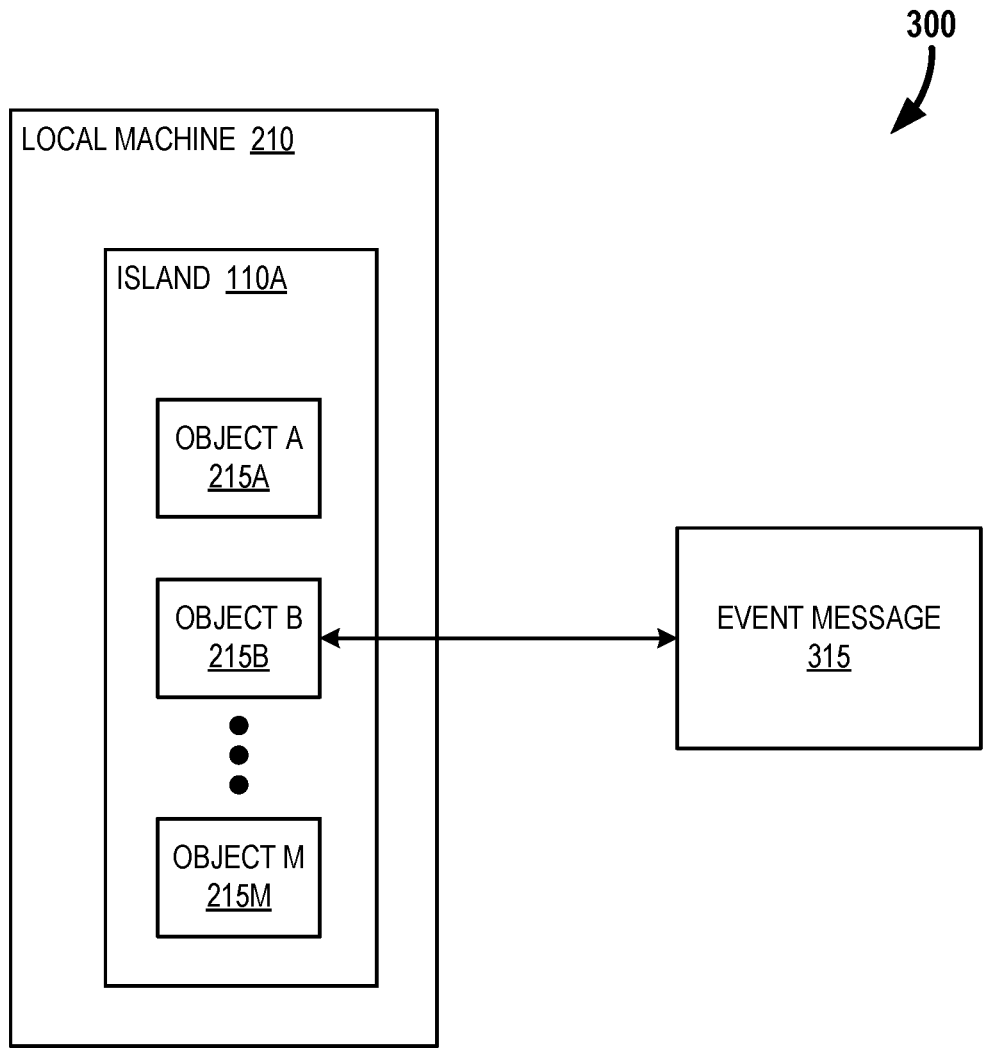
FIG. 3 is an example logical diagram of the local machine in communication with an event message, in accordance with some embodiments.

Moving to FIG. 3, it can be seen that objects 215a-m within a given island 110a can only be accessed by reference externally, whereas between objects in the island messages may be sent between the various objects directly. An external event message 315 is used whenever an object is externally accessed. By default, subscription handlers for events published in the same domain are invoked synchronously, just like a direct method call. This makes them very efficient since no buffering is required. In contrast, subscription handlers for events published in a different domain are invoked asynchronously. That means the events are buffered, and only after the code in the publisher's domain has finished running, the queued events are processed. (In a multi-threaded environment, processing of the queued events could start concurrently).

Figure 4:
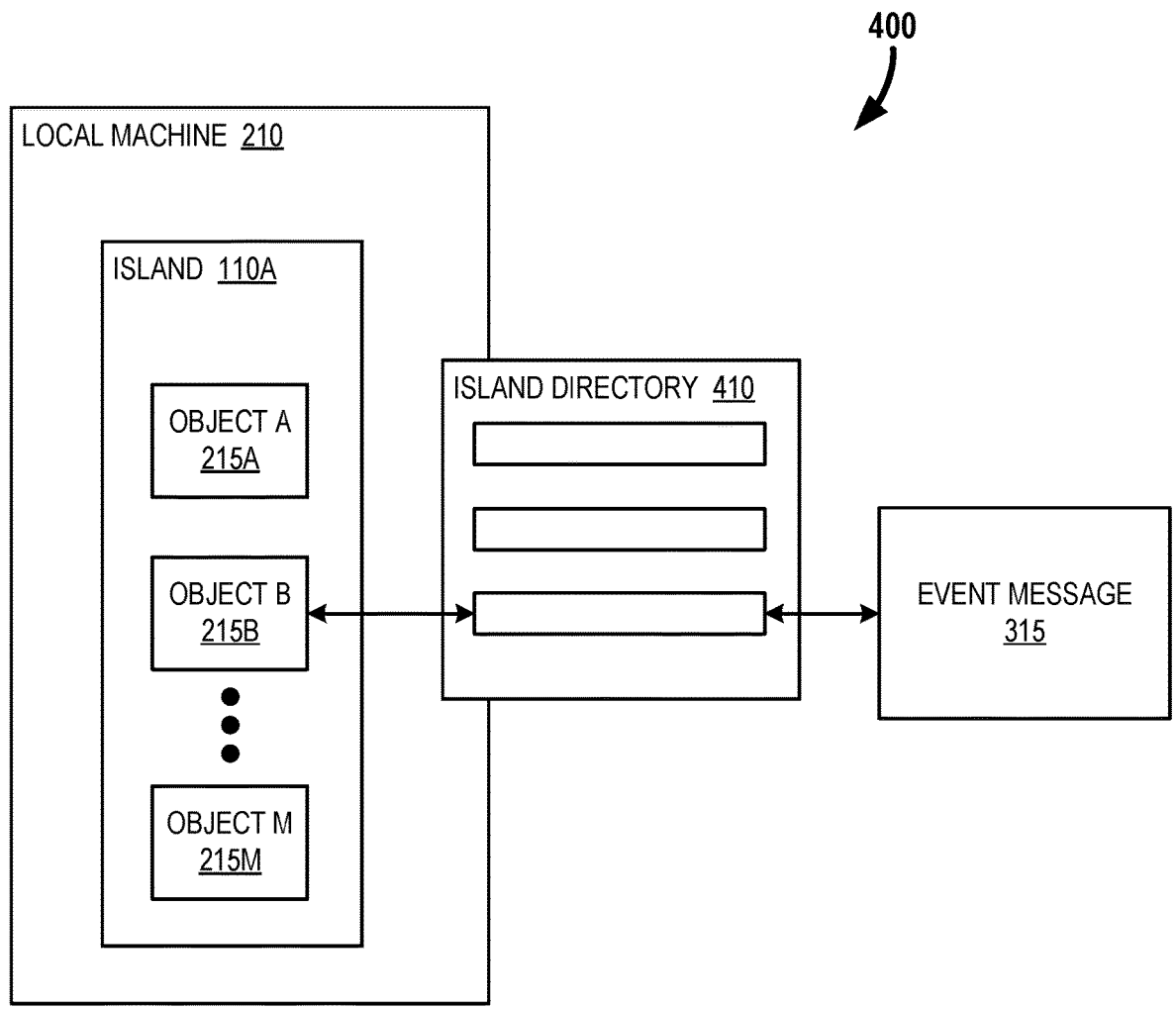
FIG. 4 is an example logical diagram of the local machine with an island directory, in accordance with some embodiments.
Figure 5:
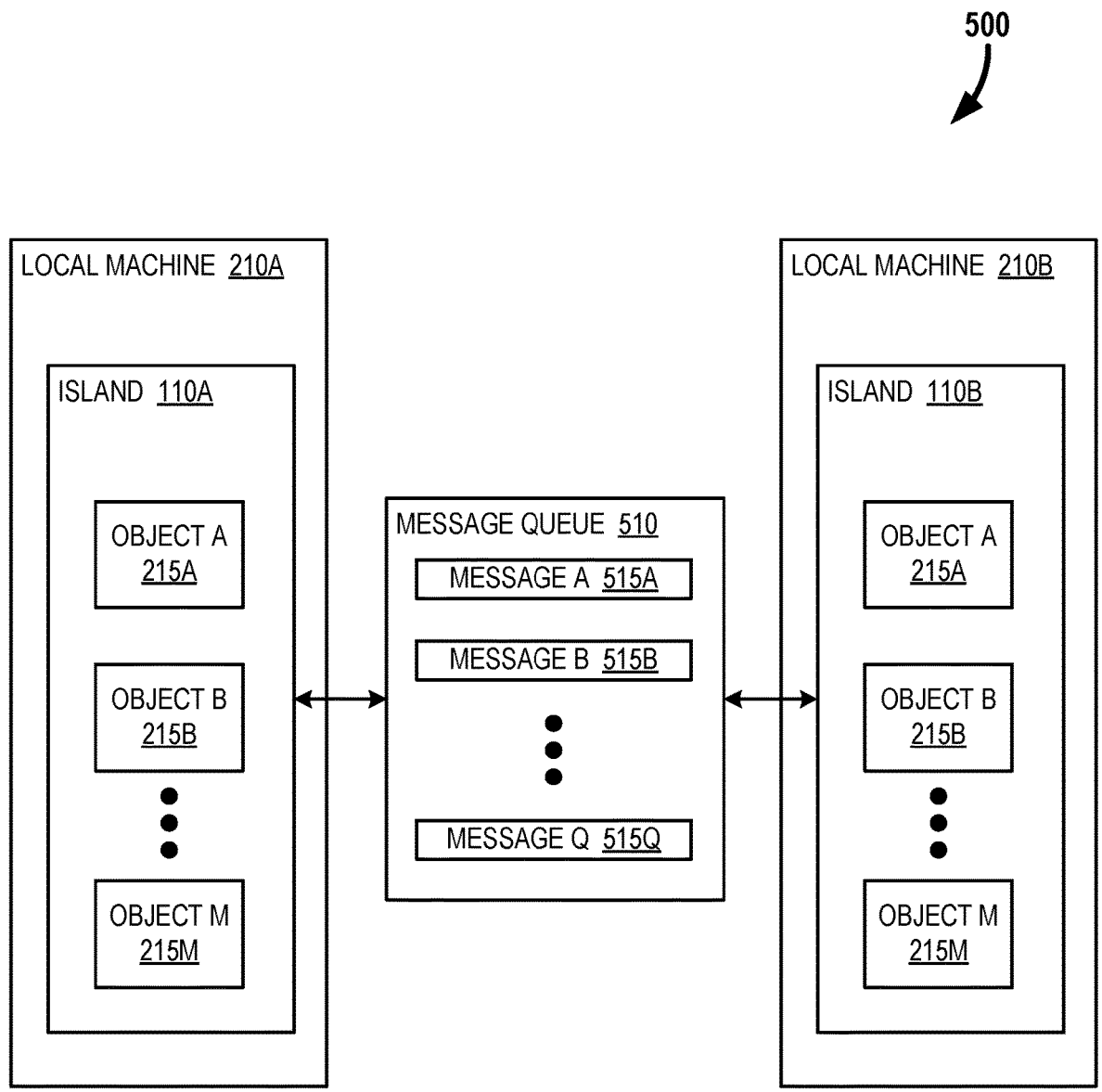
FIG. 5 is an example logical diagram of two local machines in communication with a message queue, in accordance with some embodiments.

Turning to FIG. 4, an example of this queue of events is provided, at 400. The island 110a maintains a list of the named objects in a directory 410, which is accessible externally. The messages may thus be sent indirectly to the object 215a-m in the island 110a via the event message 315. However, rather than rely upon event message 315, in some embodiments it is significantly more efficient to directly replicate events between the various islands. For example, turning to FIG. 5, two local machines 210a and 210b respectively, are communicating via a message queue 510 that includes a series of messages 515a-q which are executed in each island 10a-n in order.

The replicated islands are deterministically equivalent, which is critical for an exact replication of physics being applied upon objects in each local system respectively, and are replicated via a checkpoint mechanism that will be discussed in greater detail below. All internal future messages are implicitly replicated, and all external future messages are explicitly replicated. The island structures between all local machines remain identical, resulting in identical results between the islands; in short, object behavior is exactly identical between all gaming systems logged into the same game.

Figure 6:
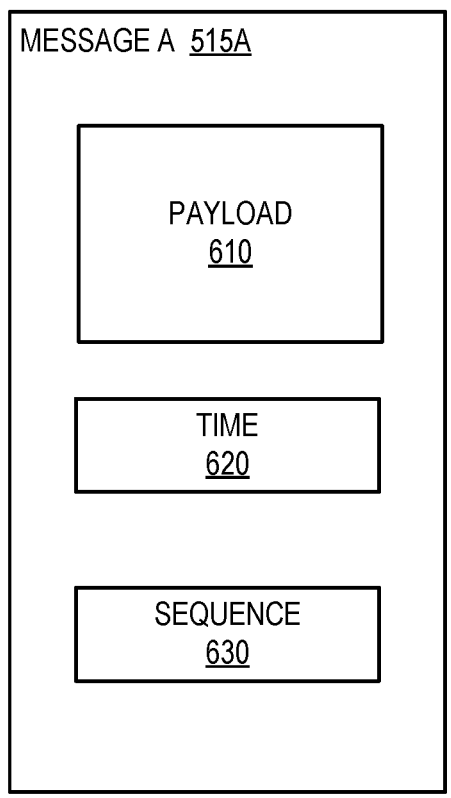
FIG. 6 is an example logical diagram of a message, in accordance with some embodiments.

The messages 515a-q are ordered in the message queue 510 in order of time. An example of a message format is provided in greater detail in relation to FIG. 6. Here it can be seen the message itself is relatively lightweight, resulting in minimal bandwidth overhead. The message 515a includes a payload 610, which may include the target, the message itself, and attendant arguments. The message likewise includes the time 620 and sequence 630. The target indicates which object the message relates to. The message itself is the action taken (e.g., to move the object for example). The argument is the condition of the message. For example, if the message is to move the object, the argument may indicate the speed, acceleration and direction in which the object should be moved. The sequence 630 element is used to order the messages within the queue 510, and therefore determine when the actions of the message are executed. The time 620 is appended by the reflector, and is used to progress execution of messages in the local machine. Messages can be generated either internally, as the result of the execution of a previous message inside of an island, or externally, as the result of an external event usually generated by one of the users of the system.

There is virtually no difference between internally and externally generated messages as far as the internal execution of the island is concerned. A major difference between the two is that the timestamps on externally generated messages are used by an island to indicate an upper bound to which the island can compute its current message queue without danger of computing beyond any possible pending messages.

The definition and manipulation of time plays the central role in how the system is able to create and maintain a replicated island state. The system must be able to guarantee that every internally generated message will be executed in exactly the proper order at exactly the proper time, which maintains the fidelity of the abstracted environment/object movements across all gaming systems. Externally generated messages must be properly interleaved with the internally generated messages at exactly the right time and order. In order to achieve this, when a new message is generated, it is inserted in the sorted queue based upon its execution time.

Figure 7:
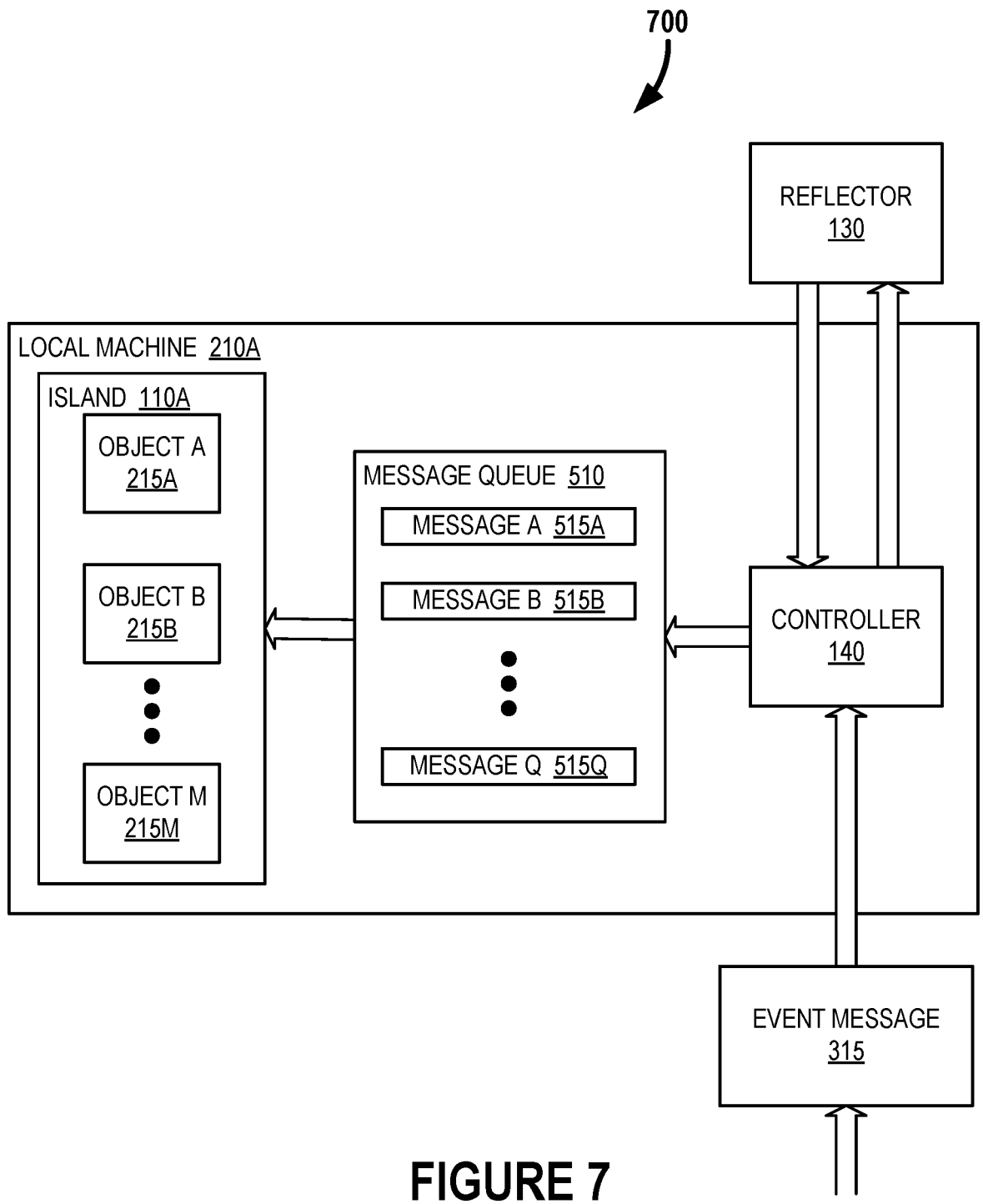
FIG. 7 is an example logical diagram of a local machine operating in conjunction with a controller and reflector in response to an external event message, in accordance with some embodiments.

Turning now to FIG. 7, a logical diagram 700 for the replication of an event is provided. At this point, the island 110a-n replica's state is identical to the original island. The state can only change in response to external events (here the event message 315). The controller 140 manages the flow of external events into the island. The controller 140 connects to the reflector server 130. All replicas of an island 110a-n on each gaming machine connect to the same reflector 130.

When an event is published outside of an island 110a-n, and an object inside the island is subscribed to it, the island's controller 140 sends the event to the reflector 130. The reflector 130 puts a timestamp on it, and relays the event to all controllers 140 for all replicas of that island, including the originating controller (hence the name, "reflector"). When the time-stamped event is received from the reflector 130, it is sorted into the island's future event queue 510. Then the simulation is advanced to the event's time stamp. If no event is sent to the reflector from any client within a certain time frame, the reflector manufactures a "heartbeat" event to advance time in the replicated islands.

Figure 8:
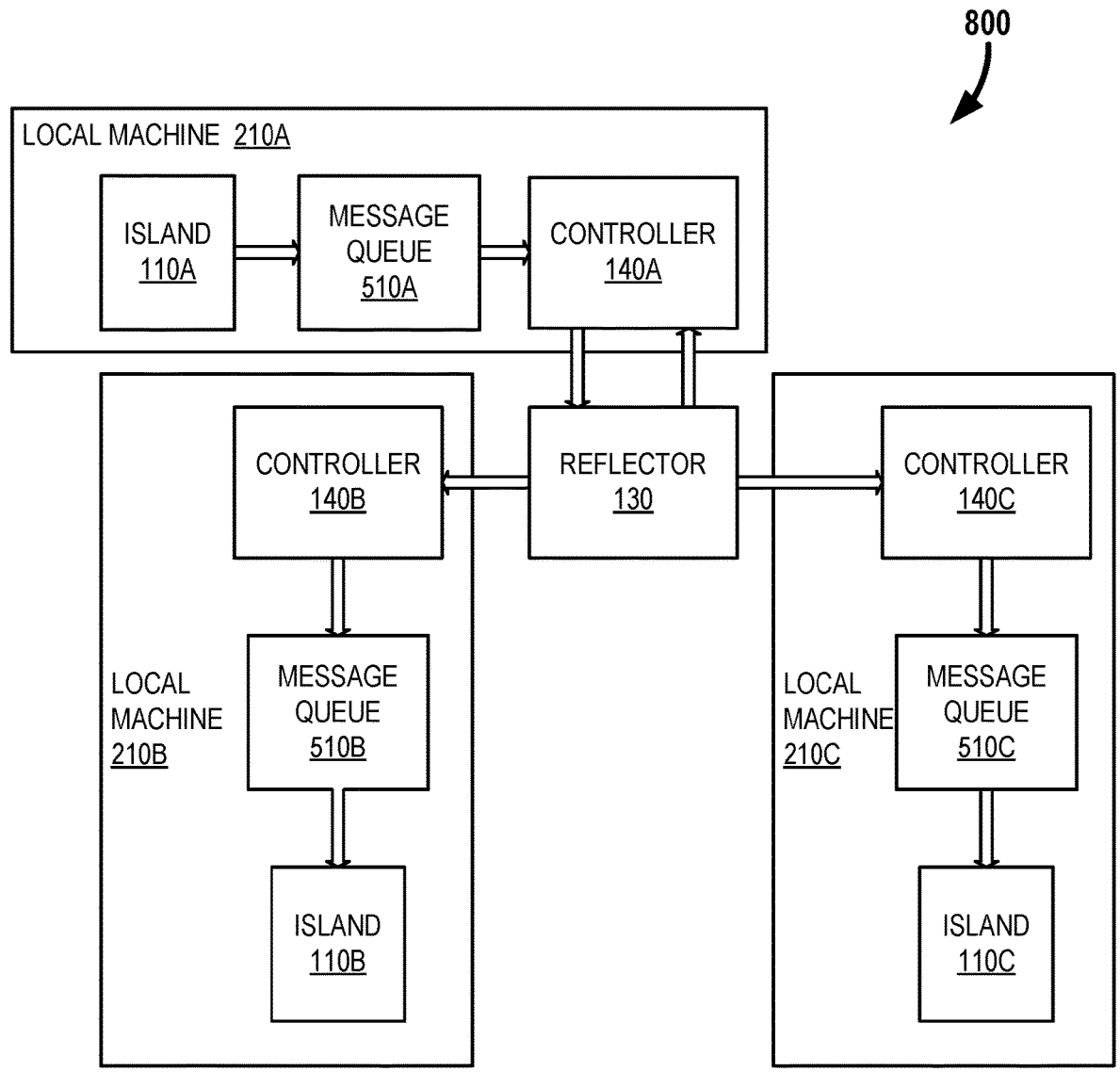
FIG. 8 is an example logical diagram of three local machines synchronizing through a reflector, in accordance with some embodiments.

While this process is illustrated in relation to a single island in reference to FIG. 7, the same process occurs when there are multiple islands with objects subscribed to the same event, as seen in FIG. 8, which is the use case when considering a multiplayer game. In this example, local machine 201a includes an island 110a that includes an event that is to be replicated across the other islands. This message is sent via the controller 140a to the reflector 130. The reflector 130 provides a unique timestamp to the message, and returns to the original controller 140a as well as all other controllers 140b and 140c that are mirroring the island. Each of the three controllers 140a-c provide the message to their corresponding message queue 510a-c, respectively. The message is ordered within the queues based upon the timestamp, and the messages are executed in time order in each local machine 210a-c in their respective island 110a-c.

As the state of each island 110a-c was initially identical, and the messages were distributed to each island and executed synchronously, the resulting environments in each island will continue to be identical. This results in perfectly identical object movements in each game according to a unified set of physics rules.

An island's view of time is defined only by the order of the messages it has in the internal queue 510. Islands can only respond to external, atomic, time-stamped messages. These messages are literally the island's clock. Though islands have internal time based messages that can be queued up, these cannot be released for computation until an external time based message has been received which indicates the outer temporal bound to which the island can compute (unlike all existing local physics engines that are currently utilized, which rely entirely upon the local machine's internal clock). Thus, even when there is a large number of internal messages ready to be executed, they remain pending until an external time stamped message is received indicating that these internal messages are free to be computed up to and including the newly received message. Each island's message queue is processed by a single thread, so issues with improperly interleaved messages do not arise.

When a message is executed, the time remains atomic in that it does not advance during the execution of this message. The "now" of the message stays the same. When a future message is generated during the current message, the new message always defines its execution time in terms of the current "now" plus an offset value. This offset should generally be greater than zero (though in fact zero is an acceptable value in certain circumstances, it should generally be avoided because if it is infinitely iterated, the system can't advance and will appear to freeze.) If multiple future messages are generated, they will have an identical "now", though they may have different offsets. If two messages are generated at the same "now" and with an identical temporal offset value, an additional message number is used to ensure deterministic ordering of the messages. All this ensures perfect fidelity between mirrored islands.

All of the messages in the island queue are "future" messages. That is, they are messages generated as the result of the execution of a previous internal message with a side effect of sending messages to another object at some predefined time in the future, or they are messages that are generated as the result of an external event—usually from a user—that is posted to the island to execute at some point in the future, usually as soon as possible. All of these messages have time stamps associated with them. The internal messages have time stamps that are determined by the original time of the execution of the message that initially posted the message plus the programmer defined offset. The external messages have a time that is determined by the reflector and is set to a value that is usually closely aligned with an actual time, though it doesn't need to be.

As noted previously, internal future messages are implicitly replicated; they involve messages generated and processed within each island replica, so they involve no network traffic. This means that an island's computations are, and must be, deterministically equivalent on all replicas. As an example, any given external message received and executed inside of a group of replicated islands must in turn generate exactly the same internal future messages that are in turn placed into the islands' message queues. The resulting states of the replicated islands after receipt of the external message must be identical, including the contents of the message queues.

Likewise, external future messages are explicitly replicated. Of course external messages are generated outside of the scope of an island, typically by one of the users of the system (such as a movement of a player within the game, shooting a crate, picking up an in game object, etc.). The replication of external messages is handled by the reflector 130 as seen previously.

External non-replicated messages are extremely dangerous and are generally avoided. If a non-replicated message is executed and happens to modify the state of an island it breaks the determinism the island shares with the other replicated copies. This can be extremely detrimental to system fidelity, except in when rendering the contents of an island, but this is extremely well controlled to avoid any breakage of determinism.

Each island has an independent view of time that has no relationship to any other island. For example, a given island could have a speed of time (relative to real time) that is a fraction of another. This is useful for collaborative debugging, for example, where an island can actually have a replicated single step followed by observation by the peers.

Since time is atomic and the external messages act as the actual clock, latency has no impact on ensuring that messages are properly replicated and global island state is maintained. Higher latency users have a degraded feedback experience as a result, but the replication does not suffer in any manner.

II. Replication Methods

Now that the general systems for a replicated collaborative shared environment for use in a unified physics between multiple gaming system have been provided in considerable detail, attention will be turned to processes employed to enable this replicated architecture.

Figure 9:
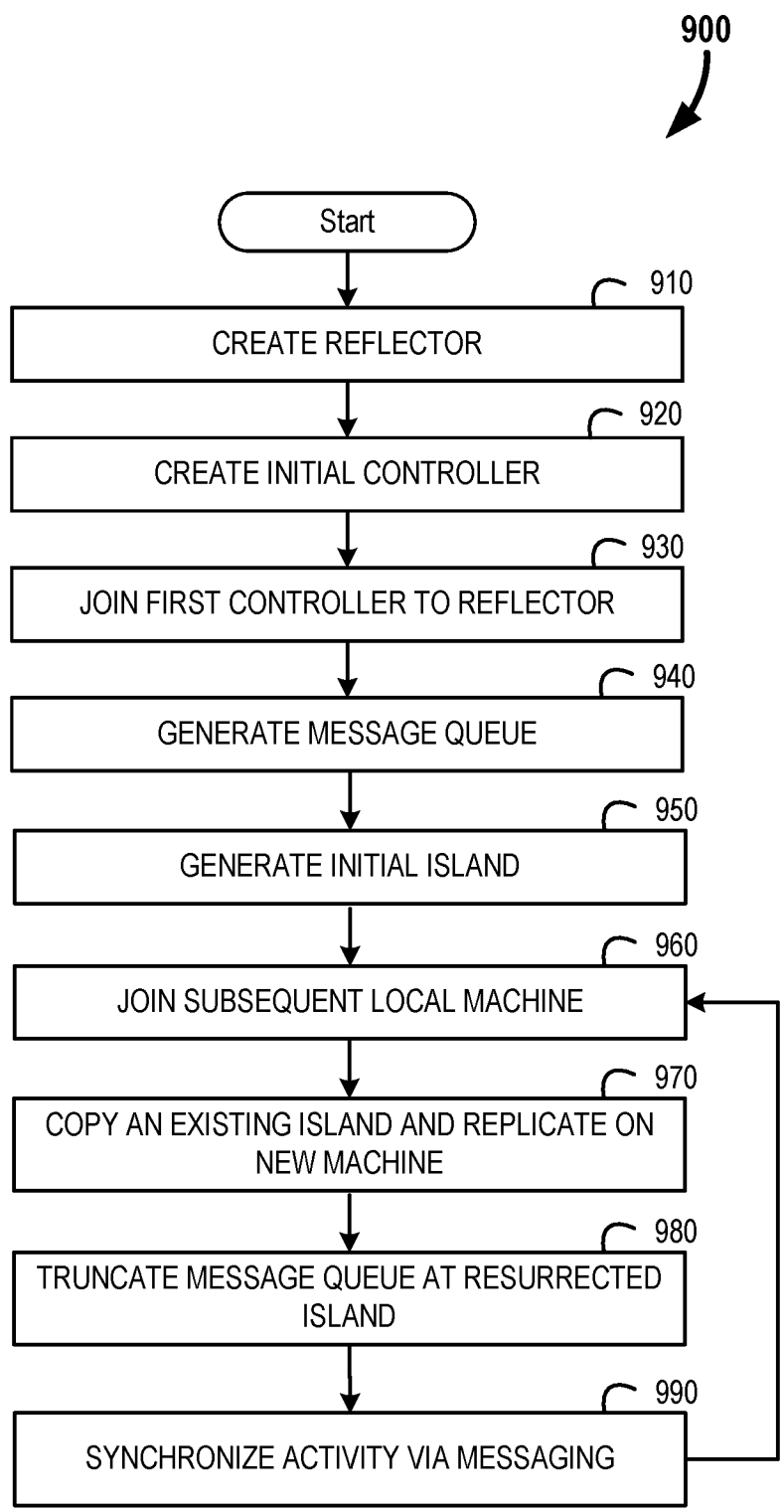
FIG. 9 is a flow diagram for an example process of generation of a shared virtual space via reflection, in accordance with some embodiments.

Turning to FIG. 9, a flow diagram 900 for an example process of generation of a shared virtual space/computations via reflection is provided. In this example process, initially a reflector is created (at 910). The local machine initializing the process will may host the initial reflector, but often the reflector is a dedicated computational device co-located at a gaming server, or otherwise distributed at a hosting server. Alternatively, the reflector can be on any accessible machine on the network—either remotely on a WAN, locally on the LAN, or on the same machine that will act as host to the original island. Reflectors are extremely lightweight objects, so they really don't take up many resources, either in space or computation. The reflector has a network address and port number that is how it may be found later.

Subsequently an initial controller is generated as well (at 920). The new controller is generally on the local machine. It is provided the reflector's address and port number. The initial controller joins the first reflector (at 930), and creates the initial message queue (at 940) by publishing its message stream to the controller. The only messages coming from the reflector at this point are the heartbeat messages—assuming the reflector has been configured to generate these. Messages are directly tied to actions that occur in-game, either from the instant player, or another player in the same "area" of the game. In any case, the controller is designed to simply begin adding these messages to its message queue. This is actually important when joining an already existent replicated island, because in that case many of the messages that get sent and stored on the queue will be necessary to bring the island replica up to date after it is replicated locally. Joining is view only access. At this point, even if there were an island, the user is not allowed to send messages that might modify it in any way.

Figure 10:
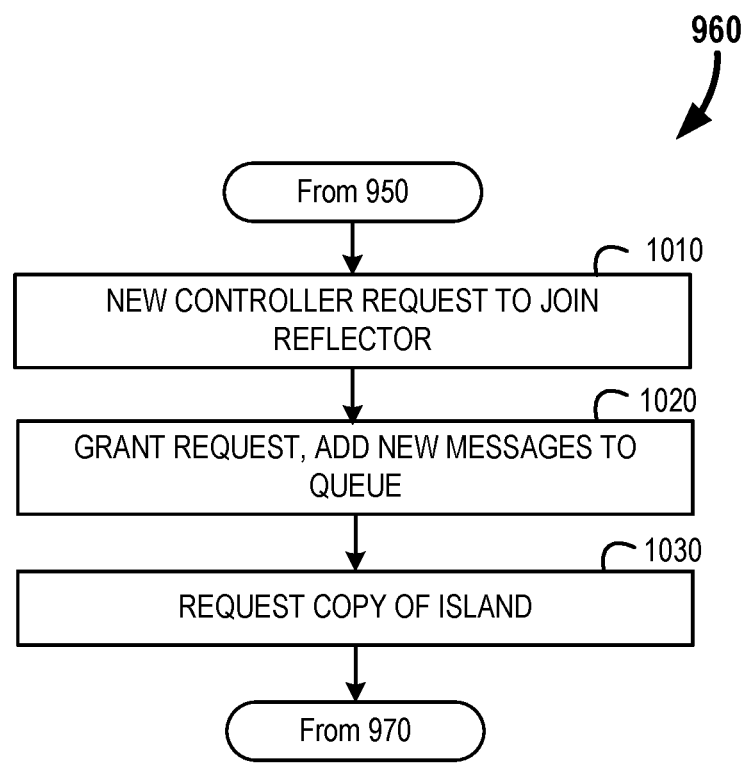
FIG. 10 is a flow diagram for an example process of the joining of a new local machine, in accordance with some embodiments.

Only after the initial queue has been generated is the initial island generated (at 950) by the controller. The game is able to populate the island and have objects within it begin sending their own internal messages to the message queue. This initial island may operate alone for as long as desired. However, when an additional gaming systems wish to join the shared environment, a subsequent local machine needs to join the island network (at 960). FIG. 10 provides a more detailed diagram of this sub-process of subsequent machine joining.

Initially the new controller for the subsequent local machine makes a request to join the reflector (at 1010). The reflector grants the request, and adds messages to the queue of the new controller (at 1020). The controller requests a copy of the island from the reflector (at 1030), which completes the joining process. Returning to FIG. 9, a copy of the initial island needs to be generated, which is then replicated onto the new machine (at 970). Importantly, the message queue for the new machine is then truncated down to the event of the replicated island copy (at 980). This truncation ensures that extraneous actions are not taken/repeated in the newly replicated island.

Figure 11:
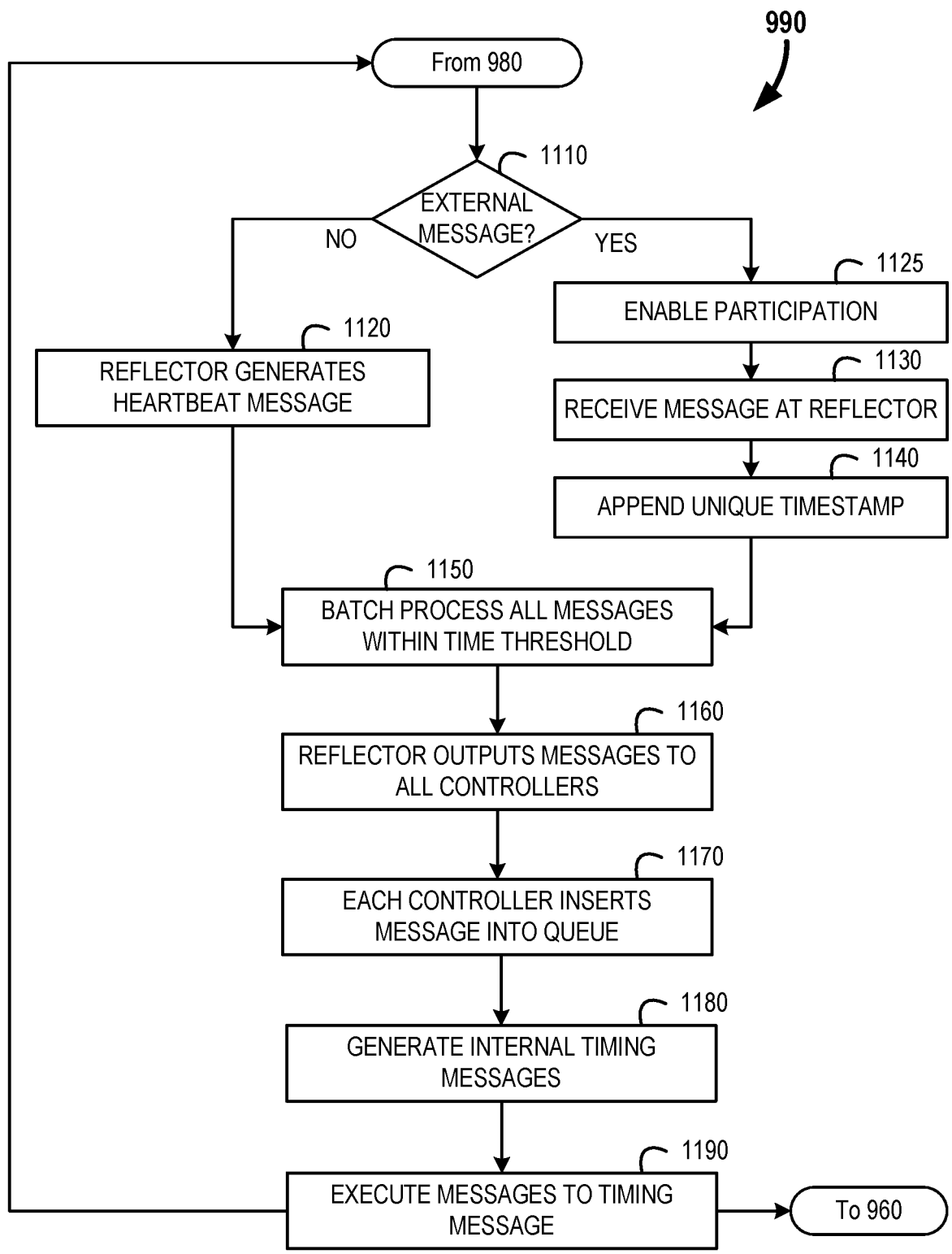
FIG. 11 is a flow diagram for an example process of the synchronizing of the islands, in accordance with some embodiments.
Figure 12:
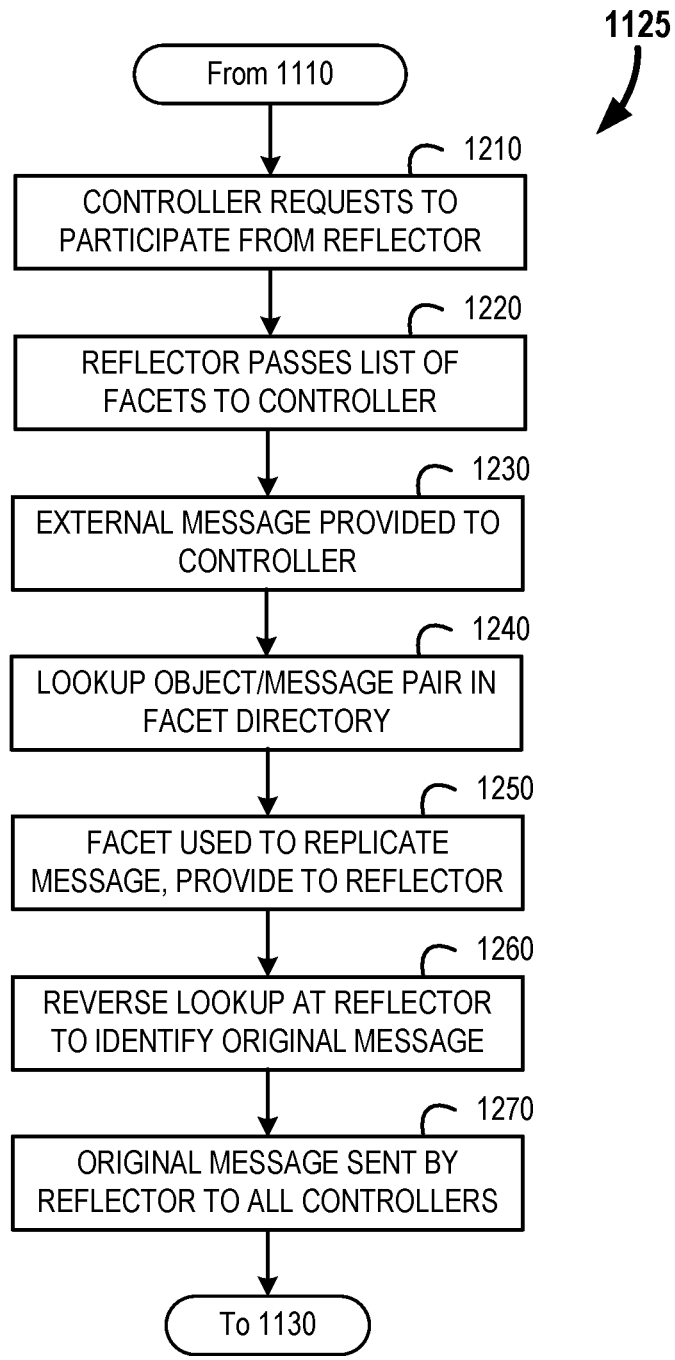
FIG. 12 is a flow diagram for an example process of the participation enablement, in accordance with some embodiments.

Lastly, the activities between the islands progress in synchrony (at 990) which is described in greater detail in relation with the process of FIG. 11. In this example process, initially a determination is made if the message is external or not (at 1110). If it is an internal message, the reflector can generate a heartbeat message (at 1120) since internal messages are unable to progress time (as previously discussed). If it is an external message however, the process must ensure that the local machines are all enabled to participate (at 1125). FIG. 12 describes this participation enablement operation in greater detail. It begins with the controller requesting to participate to the reflector (at 1210). The reflector passes a listing of facets to the controller (at 1220), and the external message is then provided to the controller (at 1230). Each facet dictionary is unique to a controller/island pair. The controller cannot send a message if it is not in the facet dictionary, thereby ensuring that only trusted gaming systems have the ability to modify a given state in the replicated islands.

The controller performs a lookup of the object/message pair in the facet directory (at 1240) and the facet is used to replicate the message. This replication is then provided back to the reflector (at 1250). At the reflector, a reverse lookup is performed to identify the original message (at 1260), and this original message is sent by the reflector to all controllers (at 1270).

Returning to FIG. 11, after enabling participation of the controllers, the external message is received at the reflector (at 1130), and a unique timestamp is appended to the message by the reflector (at 1140).

Regardless of whether the message is an external message with a timestamp appended, or a simple heartbeat message, the reflector outputs the message to all controllers (at 1160). Optionally, the reflector may collect all messages received in a given time window/threshold and batch process these messages before outputting them to the controllers (at 1150). Batch processing in this manner may cause some approximations in event timing, but for a small enough window these artifacts are not significant to impact game play. The benefit of such batch processing however, is a further reduction in required bandwidth, which may be important depending upon the type of connection between the gaming systems and the reflector, and the number of gaming systems participating in the same game.

After the messages have been received by the controllers, they are inserted into the queue at each local island (at 1170) based upon their timing. The messages in the queue may then be executed at each island in sequential order based upon the timing (at 1190). Prior to this step, however, it is also possible to generate internal timing messages based upon the received external message timing (at 1180). These internal "pseudo-heartbeat" signals may be utilized to reduce the dependence upon external heartbeat signals, thereby even further reducing bandwidth requirements.

Synchronization/processing of messages in time order is an ongoing process, and repeats as long as an island is active. Additionally, the system is able to add additional gaming systems at any time a new local machine is able and authorized to join the mirrored group.

It should be noted that in each island are 'portals' which are the main access to the various islands. Portals can (but are not required to) be overlaid on top of each other. For example, an island portal may overlay a game interface portal and system control portal, in some embodiments. Portals can include interface objects used to manipulate content of an island as well.

Islands may also include specialized objects known as 'ghost objects' which are objects that do not actually exist inside the island but behave as if they do. These objects actually exist in a separate island that is accessed by an overlay portal. Examples of these ghost objects could include portals connecting one island to another island. Thus, while islands cannot directly connect to one another they can still appear to be directly connected and act as if they are. This allows for even greater potential to expand the gaming environment beyond the area being computed by the individual gaming system.

III. Gameplay Optimization

While the basic architecture of mirrored islands provided in the above sections enables a shared environment different gaming system, attention will now be focused upon specifics of improvements in the gaming experience based upon this unified physics engine and through additional view smoothing measures taken. As previously mentioned, existing gaming systems generally rely upon locally derived physics calculations rather than through a centralized server completing all physics calculations. This is the case because a centralized processor farm for the game has extreme difficulty scaling once many hundreds, thousands, or even millions of players join one or more games.

The problem with current local calculations is that, even when using the same physics software, differences in calculations may occur based upon internal clock results, and differences in the systems' hardware. Additional errors are introduced when software versioning is not identical between all gaming systems involved. As such, the above reflector based deterministic methodology of computations may be employed with great success to ensure perfect fidelity between all gaming systems involved in the given game.

It should be noted that while the attention in this disclosure is focused upon gaming, the described high fidelity unified physics engine is likewise useful in additional contexts. For example, experimental simulations across multiple machines benefit significantly from a deterministic manner of running the simulation. Likewise, stock trading or other financial transactions may benefit from deterministic calculations that are identical between various local computer systems. Likewise, image smoothing (as will be discussed in greater detail below) is of particular use in video gaming, but also has implications for video editing, sports viewing, and any other situation where the framerate of the display exceeds the computational refresh rate of the system. Thus, while the following discussions are centered upon gaming as a use case, it should be understood that the present disclosure extends to other use cases beyond video gaming. The reference to video gaming is thus for clarification purposes and is not limiting of the disclosed systems and methods to any specific use case.

Figure 13:
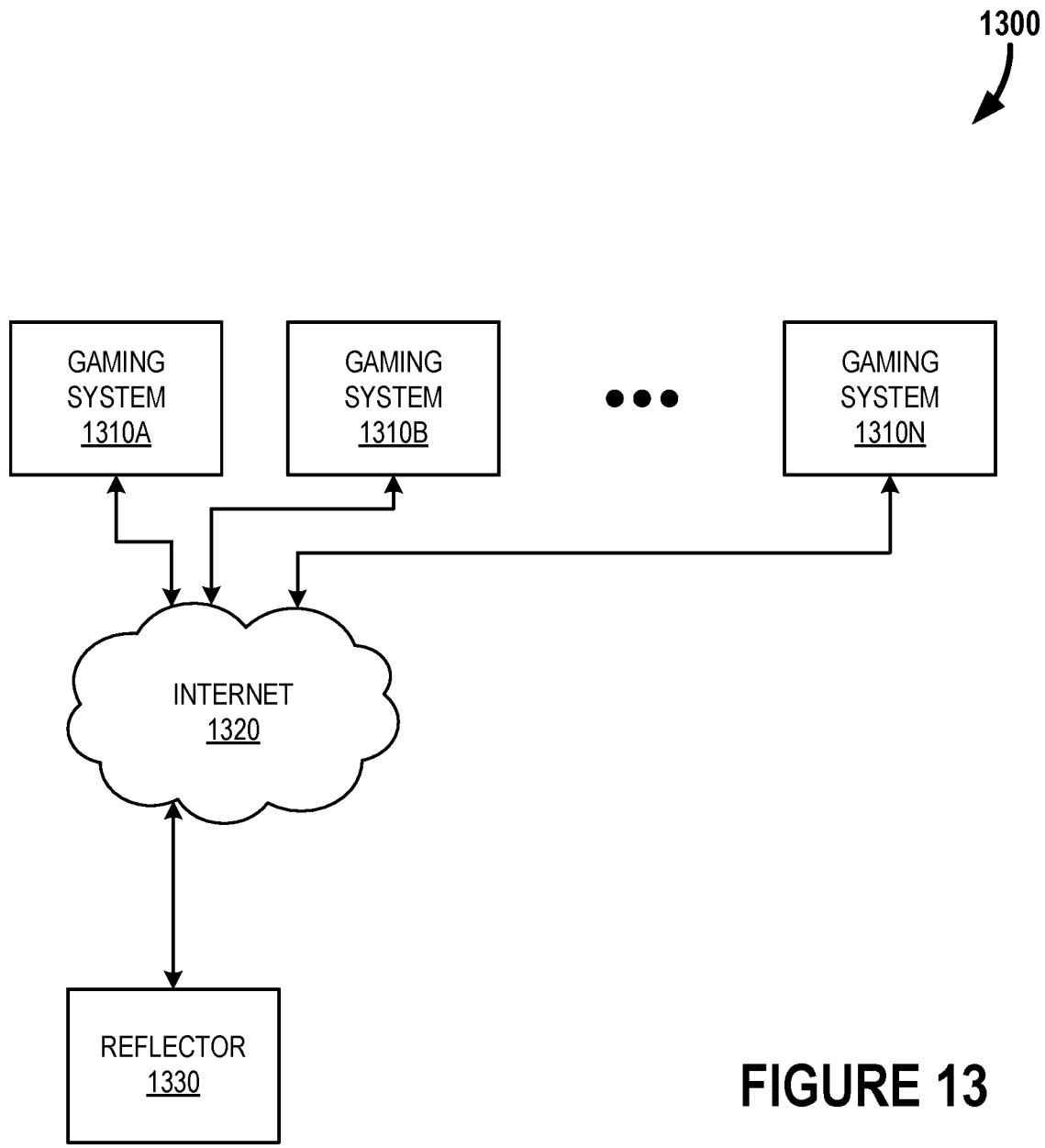
FIG. 13 is an example illustration of a series of gaming systems leveraging a unity physics engine, in accordance with some embodiments.

Turning now to FIG. 13, a generalized illustration of a multi-player gaming environment is provided at 1300. A server, including a reflector 1330, interacts with the various gaming systems 1310*a-n* via the internet 1320. The gaming systems are generally local computer rigs, including significant graphics processing capabilities. In many cases, multiple hundreds or thousands of players may be interacting with their gaming systems and engaging in simultaneous play within the same game environment (or multiple substantiations of the same game all handled by a single server or set of servers). The server(s) mediate the flow of gaming traffic between the various gaming systems, and may make executive decisions, such as world generation and the like.

Figure 14A:
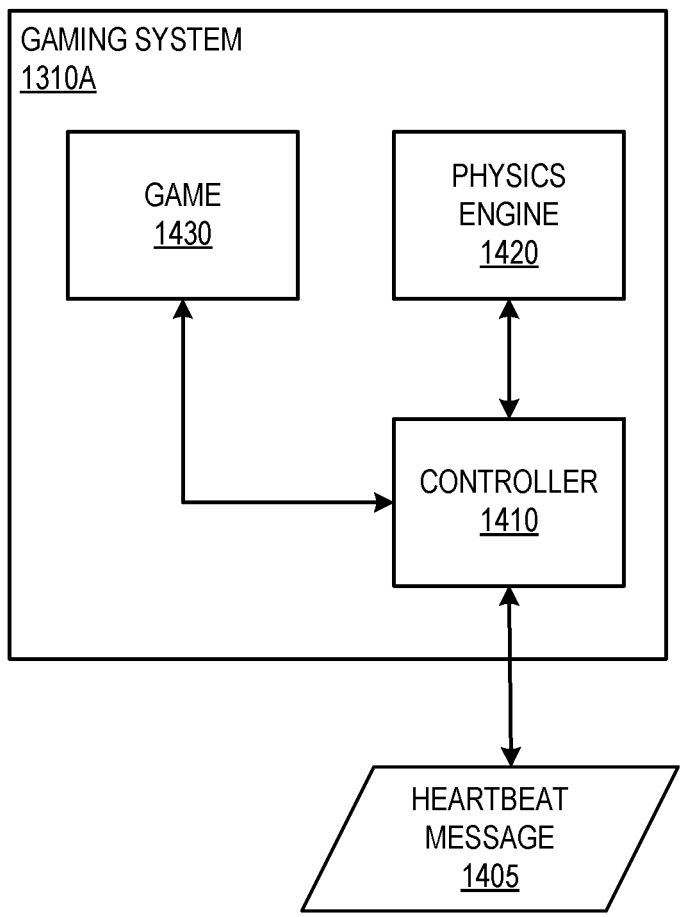
FIGS. 14A-14C are example illustrations of a gaming system and service engines in greater detail, in accordance with some embodiments.
Figure 14B:
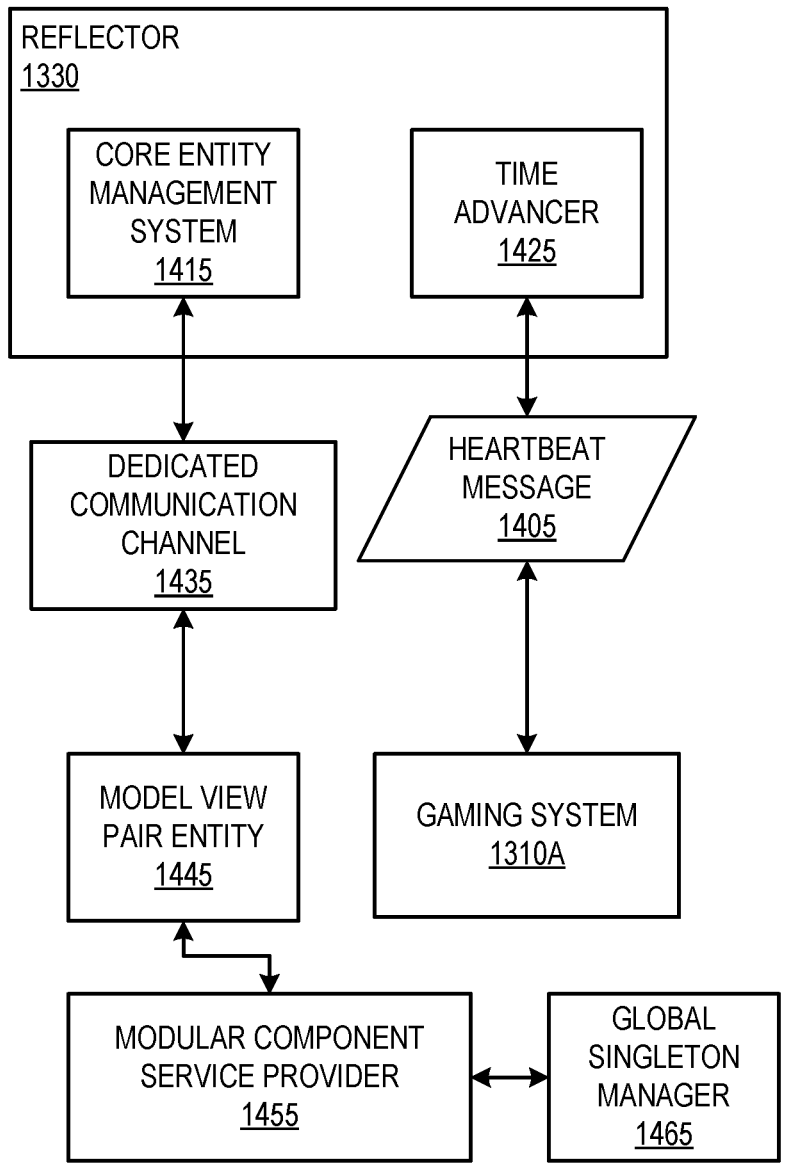
Figure 14C:
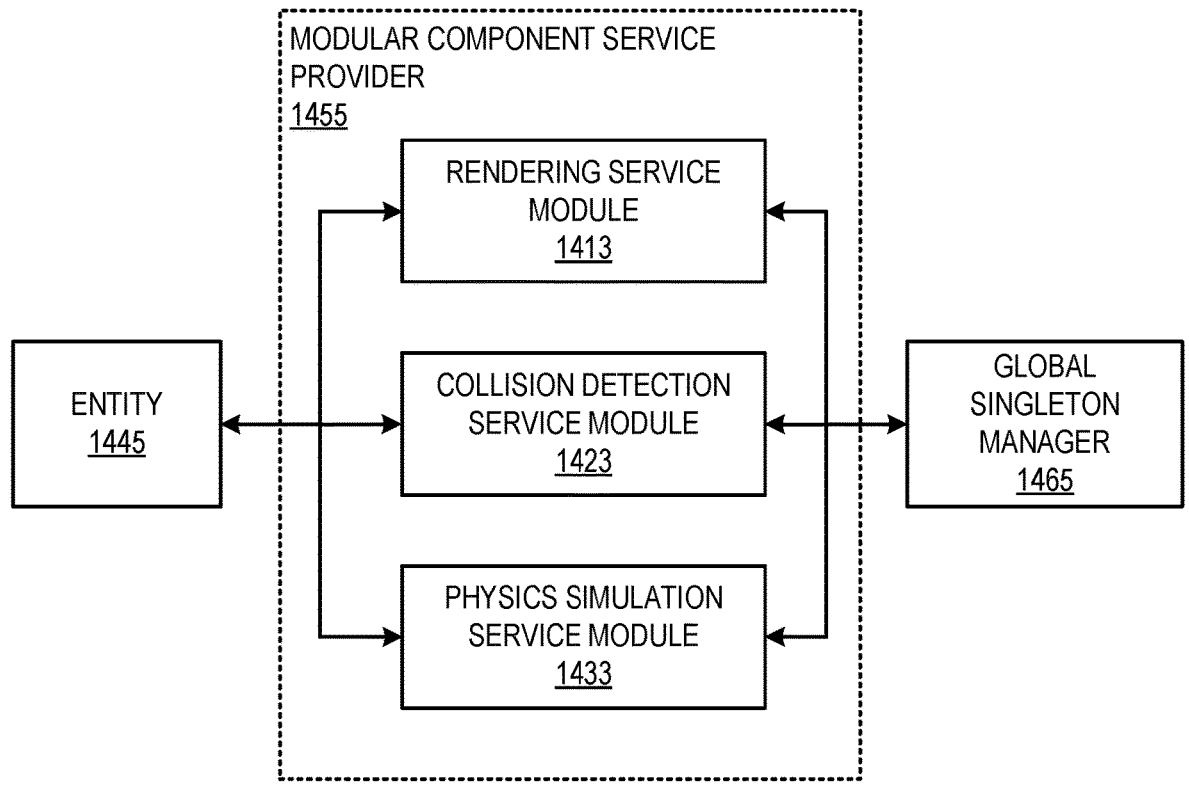

The reflector 1330 operates in the same manner as discussed previously, by managing the messages between the various gaming systems 1310*a-n*, and generating heartbeat timing messages when required. Turning to FIG. 14A, a more detailed view of each of the gaming systems 1310*a* is provided. The gaming system received messages, including heartbeat messages 1405 and event messages, as previously discussed. The gaming system includes multiple software modules, including a controller 1410, which orders the messages for execution by the unity physics engine 1420. The physics engine 1420 is a specialized form of an island intended to merely compute object and avatar movements by a set of physics rules shared between all the gaming systems. As these physics rules are identical, and the computations are completed based upon the external clock messages, the physics computations between all gaming systems 1310*a-n* are identical, which is a significant improvement over prior isolated (an incongruous) physics calculations. As noted, the unity engine is a modular game engine built on top of the Croquet synchronization SDK, as seen in relation to FIG. 14B. It consists of a core entity-management system 1415, where each entity 1445 is a model-view pair. These pairs have a dedicated communication channel 1435 so the model and the view within each entity can communicate directly with each other. The behavior of each entity can be extended through the addition of a modular components 1455. Turning to FIG. 14C, these components provide services such as rendering 1413, collision detection 1423, and physical simulation 1433. Generally, these components act as an interface between the entity 1445 and a global singleton manager 1465 that actually supplies the necessary services.

Turning back to FIG. 14A, the physics engine 1420 provides the results back through the controller 1410 to the actual game software 1430. The controller 1410 and the physics engine 1420 are illustrated as separate modules/components, but it is entirely possible that these subcomponents may be logically linked into a unified software module. This module, or the controller 1410 alone (when separate logical components), may interact as a plugin to the game software 1430.

The physics engine 1420, in some embodiments, may not be required to calculate all object movements within the game, in order to reduce processing overhead for this component. Generally the physics engine 1420 is tasked with computing object movements that have a material impact on the gameplay. For example, where a crate falls, avatar movement, bullet trajectory and the like all have an impact upon gameplay, and should be deterministically computed between all gaming systems engaged in the same game. However, non-material movements, such as the movement of trees in the wind, smoke, or dirt/spark showers, may be computed by the native physics engine within the game itself 1430. In alternate embodiments, all physics computations are calculated by the unity physics engine 1420.

Figure 15:
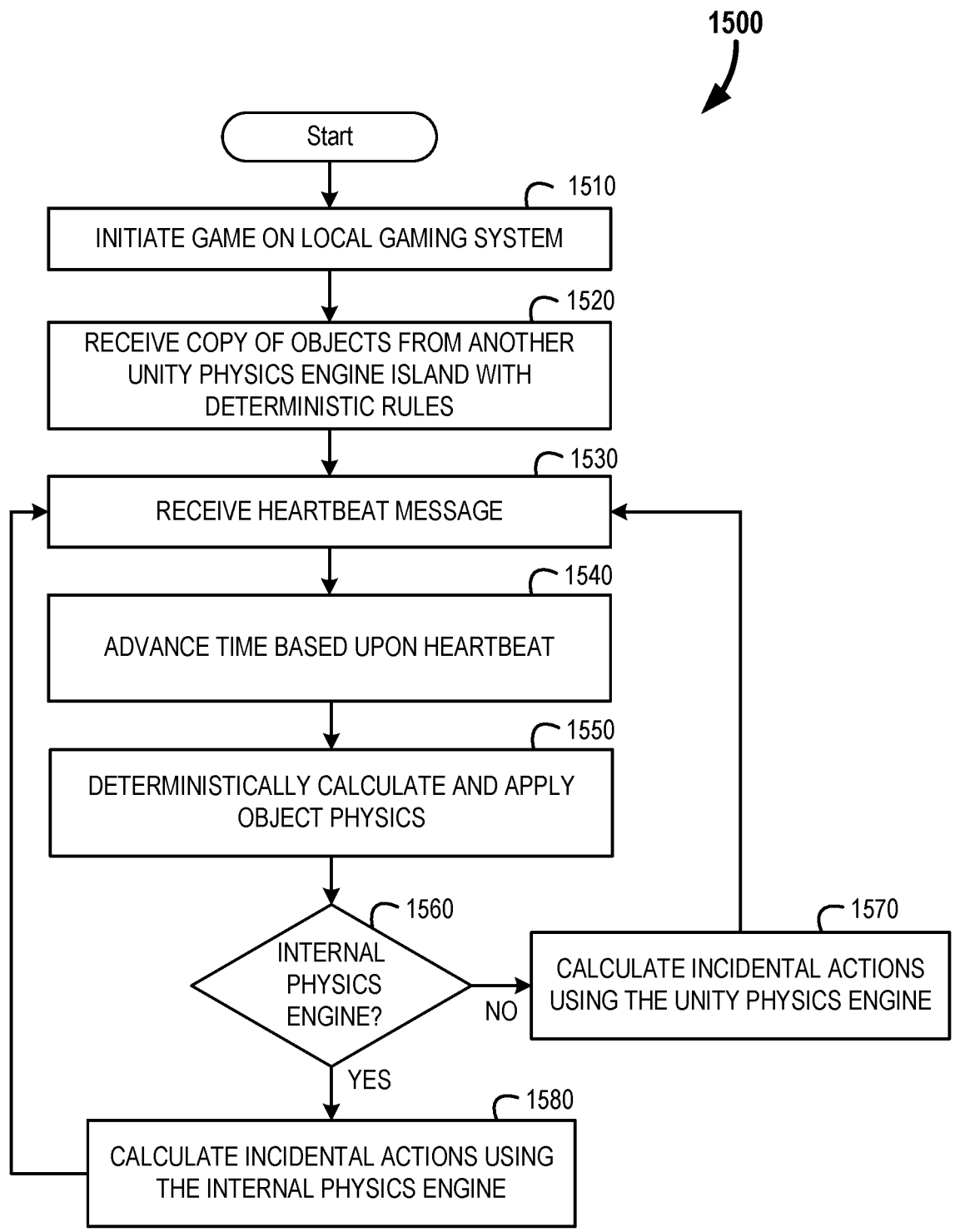
FIG. 15 is a flow diagram for an example process of operating multiple gaming systems using a unity physics engine, in accordance with some embodiments.

Moving on to FIG. 15, a flow chart of an example process of operating the unity physics engine is provided, at 1500. The process starts with the initiation of a game on a local gaming system (at 1510). The unity physics engine operates as a plugin for the game, and receives a copy of all objects from another unity physics engine already in the shared gaming session (at 1520). Alternatively, the unity physics engine may receive object data directly from the game itself.

Subsequently, a heartbeat, or other timing event message, is received (at 1530). This causes an advance in time within the unity physics engine, whereby events are processed by their offset values up to the heartbeat timing (at 1540). The events include calculations that are applied to the objects (including the avatars) within the game. These calculations are deterministically calculated and supplied to the game system for visualization (at 1550).

It is also determined if there is an internal physics engine to the game itself that will be tasked with computing non-material calculations within the game environment (at 1560). If not, these remaining calculations are likewise performed by the unity engine and supplied back to the game for implementation (at 1570). However, when available, the internal game physics engine may be leveraged to perform these incidental calculations (at 1580) thereby reducing latency for these activities, and likely increasing refresh rates of these incidental objects. Regardless of whether the incidental calculations are performed by the internal physics engine of the game, or by the plugin unity physics engine, the process returns to waiting for and receiving the next timing message, and repeating the process for each refresh cycle.

As eluded to, the rate of unity engine refresh is marginally slower that the rate of an internal physics engine. This refresh rate is limited by the slowest gaming system within the game. The gaming systems all need to execute the events deterministically, and if one device is required to take longer due to computational constraints, then this reduces the refresh rate for all devices. As such, in general, the refresh rate for the unity physics engine is on the magnitude of 100-200 ms. In contrast, the frame rate of most displays is 30, 60 or 120 frames per second. Thus, the rate of object movement refresh can be as low as one refresh per 24 display frames (assuming a 200 ms physics engine refresh and a 120 fps display). While not noticeable in the majority of contexts, in some environments, such as gaming, video editing, sports and the like, this may result in an unacceptable level of image stutter or jitter. Thus, there is a need for image smoothing within these critical spaces.

Figure 16:
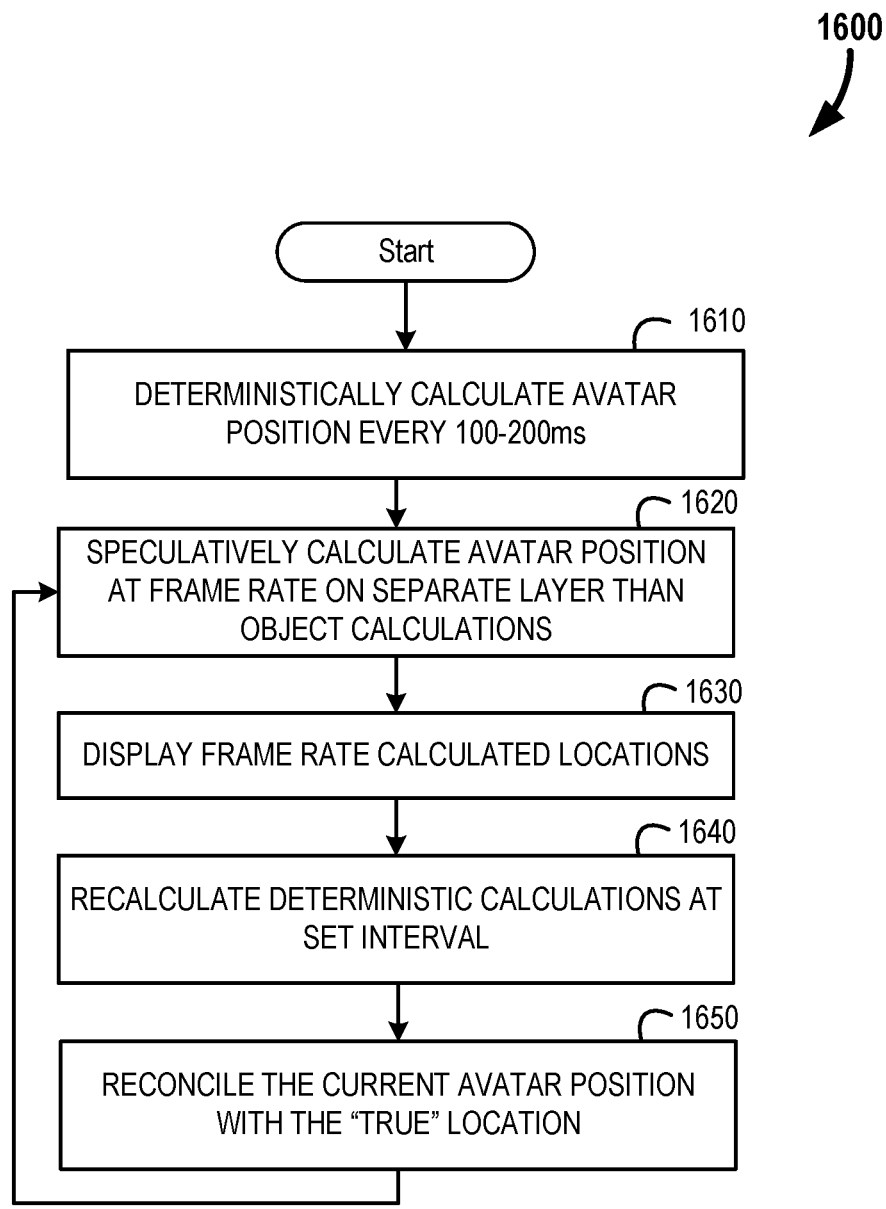
FIG. 16 is a flow diagram for an example process of avatar visualization image smoothing, in accordance with some embodiments.

To that end, FIG. 16 provides a flow diagram for an example process of avatar smoothing, at 1600. As noted, the deterministic calculation of the avatar's movements are made every 100-200 ms (at 1610). This corresponds to s refresh rate of 5-10 times per second. In contrast, video refresh rates are typically 30, 60 or even 120 frames per second. Empirically, we know humans can discern up to 150 frames per second (with diminishing returns as frame rates increase in number). As such video smoothing from the actual refresh rate to the maximum video frame rate is advantageous.

In order to do so, the local gaming system speculatively calculates the avatar position at the frame rate (at 1620). This is done on a separate layer than object calculations, which will be discussed in greater detail below. Since the system can receive user inputs, these inputs may be incorporated into the speculative calculations in order to ensure a closer match between deterministic calculation performed at the slower refresh rate, and the more frequent speculative calculations.

The speculative calculations are then displayed to the user at the frame rate (at 1630), resulting in an entirely smooth avatar movement. When it is time for a deterministic calculation refresh, this is performed (at 1640). At this point the speculative calculation endpoint is compared against the deterministic calculation. Often there will be a small discrepancy between these calculation, which may necessitate a reconciliation between the current speculative avatar position and the "true" deterministic position (at 1650). This reconciliation step will be discussed in greater detail below. After the reconciliation, the process returns to recalculating the avatar position on a speculative course between deterministic calculations.

Figure 17:
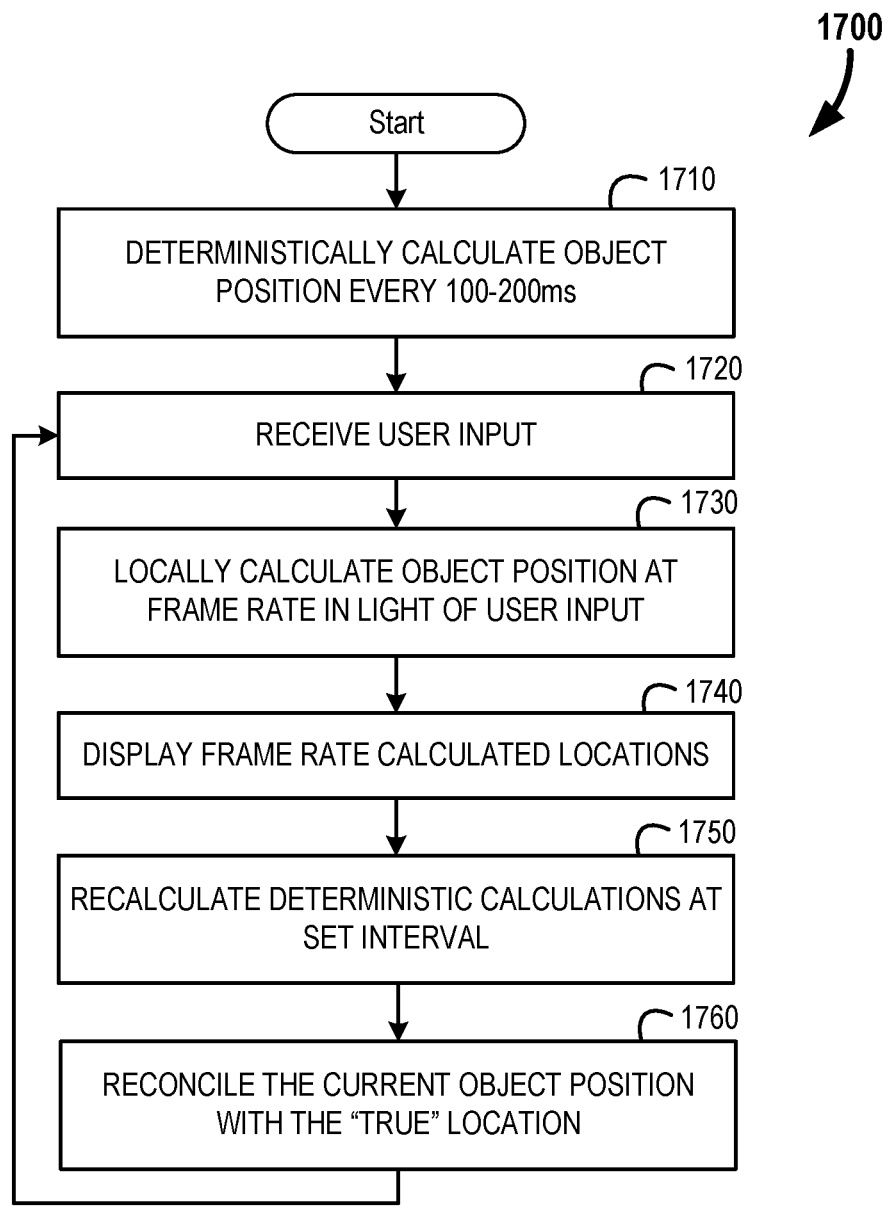
FIG. 17 is a flow diagram for an example process of object visualization image smoothing, in accordance with some embodiments.

Similar to avatar smoothing, it is desirous to likewise smooth the visualization of objects. This process 1700 is illustrated at FIG. 17, and mimics the avatar smoothing process in many regards. As with avatar smoothing, the process begins with the deterministic calculation of the object position (at 1710) at a rate of every 100-200 ms. The system then receives user inputs (at 1720), such as shooting an object, picking up an object, or other similar types of interactions.

The local computer system then calculates the object's position in light of these user inputs at, or more frequently than, the display frame rate (at 1730). These speculative calculations are then displayed (at 1740) at the frame rate.

The deterministic calculations are then refreshed at their standard refresh rate (at 1750), and reconciliation, when necessary, is performed (at 1760). The process then repeats by again receiving user inputs and performing speculative calculations. This object speculative calculation generally is far less likely than avatar smoothing to require reconciliation, as avatars are far more likely to be acted upon by another user between the deterministic recalculations. This is a primary reason that object speculative calculations are performed on a separate layer from avatar calculations.

Figure 18:
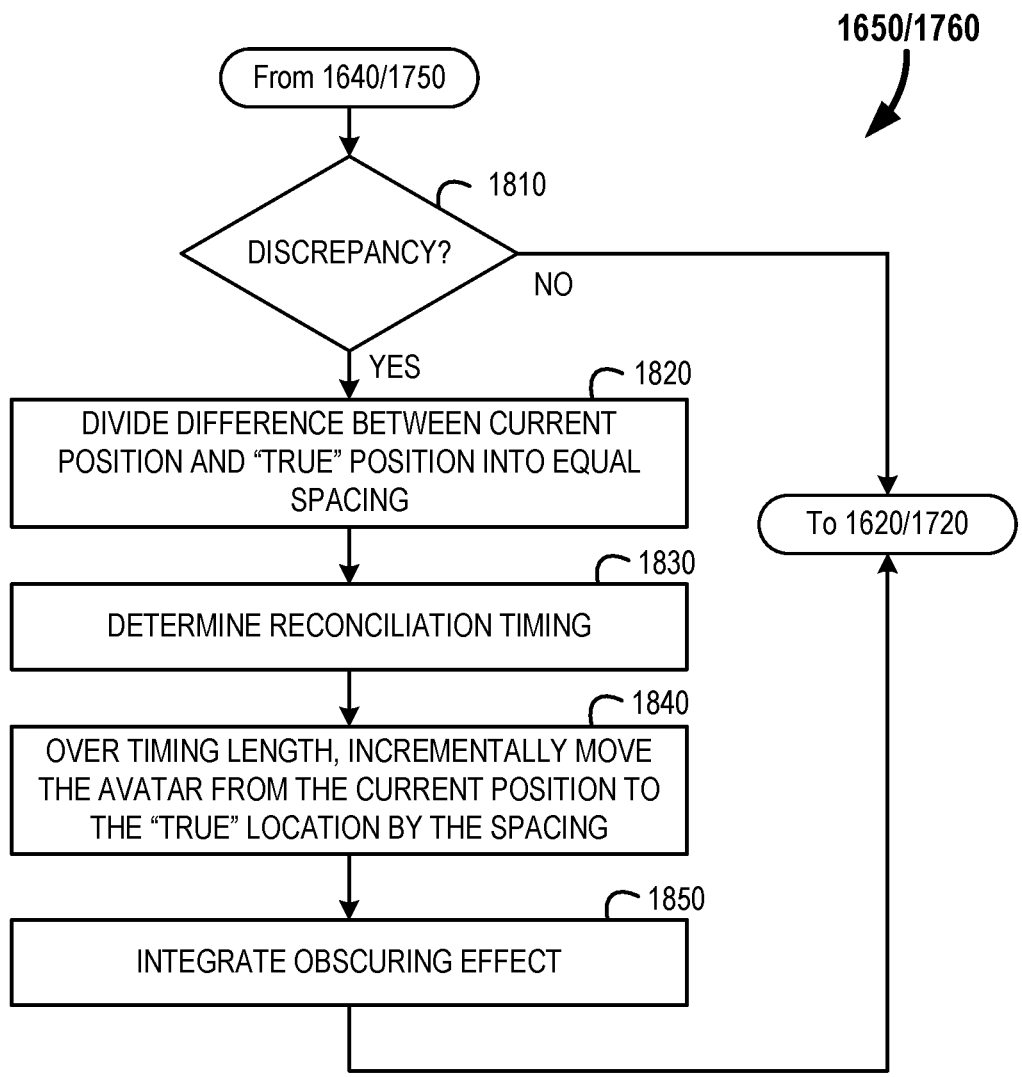
FIG. 18 is a flow diagram for an example process of reconciliation between a smoothed visualization and a true position, in accordance with some embodiments.
Figure 19A:
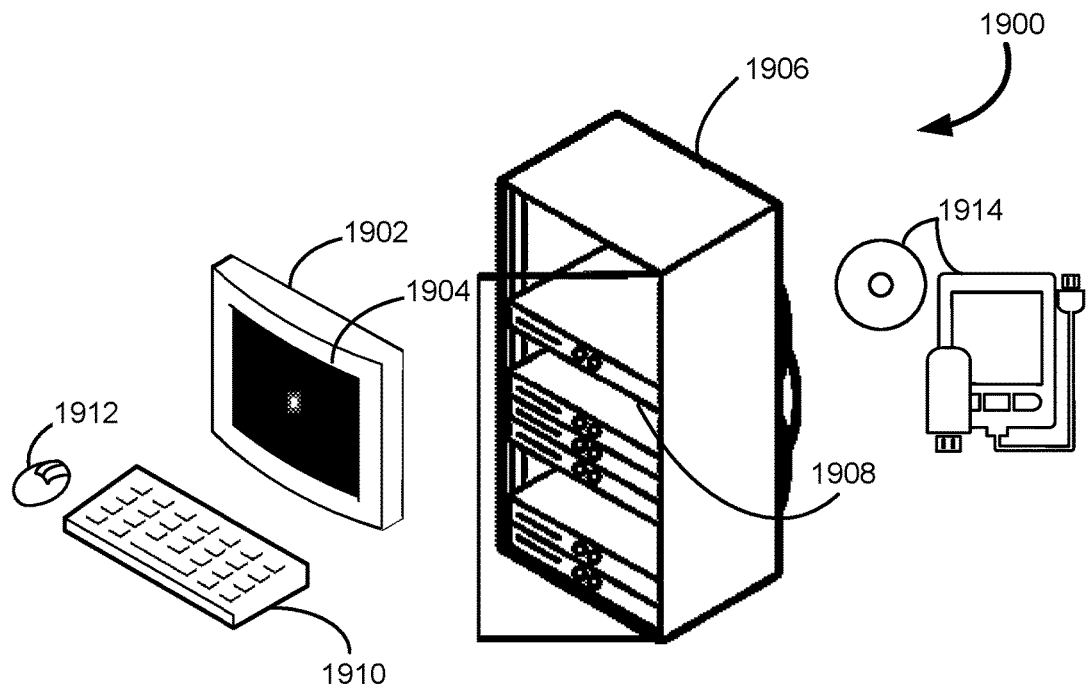
FIGS. 19A and 19B are example illustrations of a computer system capable of embodying the current invention.
Figure 19B:
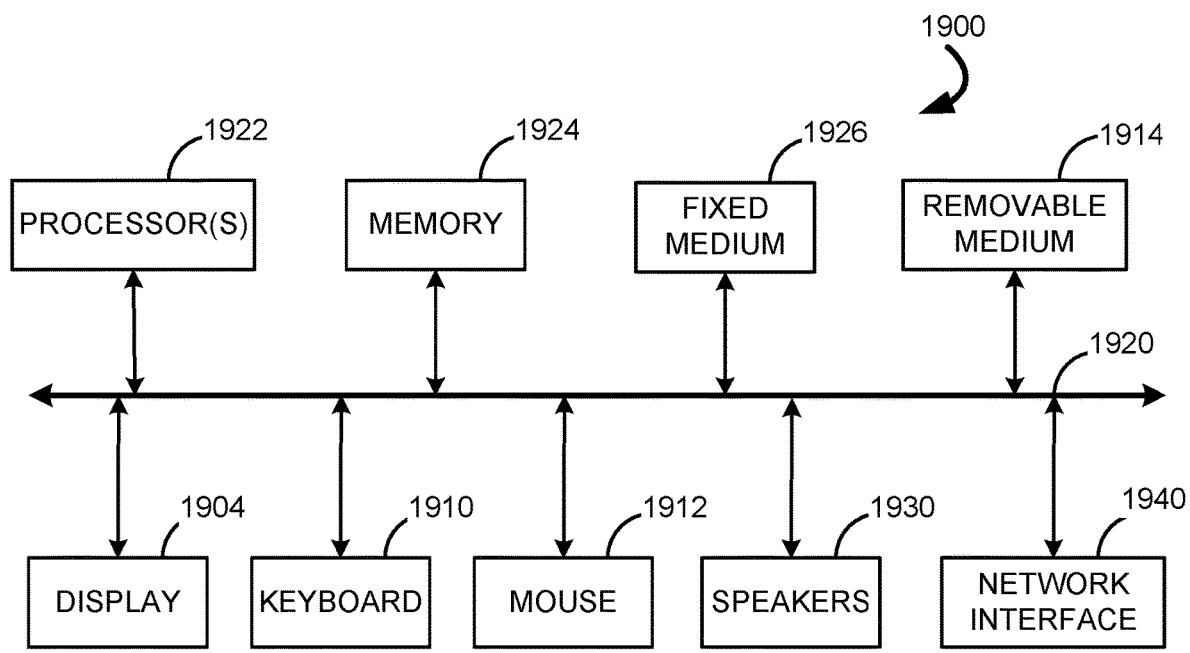

FIG. 18 provides an example process for the reconciliation between the deterministic "true" position of an avatar and/or object, and that of the speculatively calculated current position. This process is identical regardless of whether the reconciliation is for an avatar or an object, and initially begins with the determination if there is even a discrepancy between the current location and the deterministic calculations for the avatar/object positioning (at 1810). If no discrepancy exists, the process is simply ended, and returns to recalculation of the speculative locations between the deterministic refresh periods.

However, if there is a discrepancy present, then the system determines he size of the difference between the discrepancy, and divided the difference between the true location and the current position by an equal number of spacings (at 1820). In some embodiments, the number of spacings is dependent upon the magnitude of the difference between the current position and the true position, with larger differences being divided into larger numbers of spacings, and more minor discrepancies being only one or two spacings. In some alternate embodiments, the difference between the spacings may be divided into a reconciliation timing period divided by the frame rate timing. For example, it may be desired to reconcile the difference within 25 ms. Assume the frame rate is 120 frames per second, or 8.33 ms. In this example, the reconciliation number would equal 3 (25/8.33).

Regardless of method employed, the reconciliation time is determined (at 1830). As noted above this may be a set period, or may scale based upon the difference in distance between the true position and the speculative current position. However, generally this reconciliation time period is between 2-40 ms, and more preferable between 5-20 ms, and often is closer to 10 ms. At this stage the position of the avatar or object is incrementally moved between the current position to the true location over the reconciliation time period by the spacing amount (at 1840). In some embodiment, depending upon the reconciliation timing length, the position the object/avatar is moved to may not be the last "true" position, but instead the new speculative position that has most recently been calculated based upon the last "true" deterministic position.

After the object/avatar has been accordingly reconciled, it may be desirable to incorporate some sort of obscuring effect (at 1850) to minimize any visual disturbance caused by the reconciliation. For example if two tanks collide within the game, initially the very edges of the tanks may protrude into one another, before the deterministic calculations indicate that the collision has occurred and backs the tanks up marginally such that the objects do not intersect. By incorporating in a shower of sparks, crumpling of the collision space, or other obscuring effect, the reconciliation may be entirely imperceptible to the user. Other obscuring effects may include dirt clods being shot up, smoke, or loss of control of the visual field (such as when the avatar runs into an object or other barrier). Once the obscuring effect (if any) is incorporated, the reconciliation ends, again returning to the original process of smoothing where speculative movements are calculated between deterministic calculations.

IV. System Embodiments

Now that the systems and methods for the collaborative virtual environment for a unified physics engine within a gaming environment have been described, attention shall now be focused upon systems capable of executing the above functions. To facilitate this discussion, FIGS. 20A and 20B illustrate a Computer System 2000, which is suitable for implementing embodiments of the present invention. FIG. 20A shows one possible physical form of the Computer System 2000. Of course, the Computer System 2000 may have many physical forms ranging from a printed circuit board, an integrated circuit, and a small handheld device up to a huge super computer. Computer system 2000 may include a Monitor 2002, a Display 2004, a Housing 2006, a Storage Drive 2008, a Keyboard 2010, and a Mouse 2012. Storage 2014 is a computer-readable medium used to transfer data to and from Computer System 2000.

FIG. 20B is an example of a block diagram for Computer System 2000. Attached to System Bus 2020 are a wide variety of subsystems. Processor(s) 2022 (also referred to as central processing units, or CPUs) are coupled to storage devices, including Memory 2024. Memory 2024 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Storage 2026 may also be coupled bi-directionally to the Processor 2022; it provides additional data storage capacity and may also include any of the computer-readable media described below. Fixed Storage 2026 may be used to store programs, data, and the like and is typically a secondary storage medium (such as a hard disk) that is slower than primary storage. It will be appreciated that the information retained within Fixed Storage 2026 may, in appropriate cases, be incorporated in standard fashion as virtual memory in Memory 2024. Removable Storage 2014 may take the form of any of the computer-readable media described below.

Processor 2022 is also coupled to a variety of input/output devices, such as Display 2004, Keyboard 2010, Mouse 2012 and Speakers 2030. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Examples of typical input/output devices that are particularly relevant to a virtual 3D environment being proposed may include direct interfaces to the gaming software, and to displays for the game players.

Processor 2022 optionally may be coupled to another computer or telecommunications network using Network Interface 2040. With such a Network Interface 2040, it is contemplated that the Processor 2022 might receive information from the network or might output information to the network in the course of performing the above-described virtual environments. Furthermore, method embodiments of the present invention may execute solely upon Processor 2022 or may execute over a network such as the Internet or a wireless network (e.g., a cellular network) in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 2000 can be controlled by operating system software that includes a file management system, such as a storage operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a virtual machine, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A unified gaming engine system within a multi-player gaming environment comprising:
   a core entity management system in a reflector server, wherein each entity is a model-view pair, and wherein the reflector server provides a time advancement message on a periodic basis;
   a dedicated communication channel between each entity enabling the model to directly communicate with the view within the given entity; and
   at least one modular component operating within a computer system, the modular components providing at least one service including a physics simulation service, the physics simulation service on each of the at least one modular component configured to receive a plurality of messages, wherein the messages are arranged in a message queue by execution time, and wherein the messages include an action to be taken by the physics simulation service, and wherein the physics simulation service receives the singular time advancement message and executes the messages in the message queue up to the time advancement message irrespective of an internal clock signal of the computer system.

2. The system of claim 1, wherein the at least one service includes a rendering service and a collision detection service.

3. The system of claim 2, wherein the physics simulation service comprises multiple gaming systems for initializing a game and a plug-in physics engine.

4. The system of claim 3, wherein the reflector provides a time advancement message to a controller of the plug-in physics engine.

5. The system of claim 4, wherein the plug-in physics engine computes positions of material objects within the game.

6. The system of claim 4, wherein all gaming systems process messages via the plug-in physics engine up to the timing message, using a common set of physics rules, to deterministically compute positions of objects within a gaming environment.

7. The system of claim 6, wherein the plug-in physics engine provides the object positions to the game.

8. The system of claim 1, wherein the at least one service acts as an interface between each entity and a global singleton manager.

9. The system of claim 8, wherein the global singleton manager supplies the at least one service.

10. The method of claim 1, wherein the periodic basis is every 100-200 ms.

11. A computerized method for a unified physics engine, the method comprising:

generating, on a local computer system, a virtual environment including objects, wherein the objects within the virtual environment are capable of actions, and wherein the objects subscribe to events;

generating a message queue of timestamped messages, wherein the messages include the actions, and wherein each message includes a timestamp and are arranged in the message queue by execution time;

receiving at the local computer system a time advancement message; and executing the messages in order in the message queue up to the time advancement message irrespective of an internal clock signal of the local computer system, thereby deterministically calculating position of the objects.

12. The method of claim 11, further comprising dividing game elements into material components and non-material components.

13. The method of claim 12, wherein the material components are objects.

14. The method of claim 13, wherein an internal physics engine computes calculations for the non-material components.

15. The method of claim 11, further comprising smoothing movements of the objects by speculatively calculating object positioning at a given frame rate.

16. The method of claim 15, further comprising reconciling location of the objects that have been positioned using speculative positioning with the deterministically calculated position.

17. The method of claim 16, wherein the reconciling is smoothed by frame rate over a reconciliation time period.

18. The method of claim 17, wherein the reconciliation time period is less than 10 ms.

19. The method of claim 16, wherein the reconciling is obscured by an obscuring effect.

* * * * *